(12) United States Patent
Want et al.

(10) Patent No.: US 9,071,282 B1
(45) Date of Patent: Jun. 30, 2015

(54) VARIABLE READ RATES FOR SHORT-RANGE COMMUNICATION

(75) Inventors: Roy Want, Los Altos, CA (US); Richard Carl Gossweiler, III, Sunnyvale, CA (US); William Noah Schilit, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/612,166

(22) Filed: Sep. 12, 2012

Related U.S. Application Data

(60) Provisional application No. 61/594,206, filed on Feb. 2, 2012.

(51) Int. Cl.
*H04B 5/00* (2006.01)
*H04Q 5/22* (2006.01)
*G08B 13/14* (2006.01)

(52) U.S. Cl.
CPC .................................. *H04B 5/0031* (2013.01)

(58) Field of Classification Search
CPC .................................................. G06K 19/0723
USPC ................. 340/10.1, 10.2, 540, 572.1, 854.8; 455/41.1
See application file for complete search history.

(56) References Cited

U.S. PATENT DOCUMENTS

| | | | |
|---|---|---|---|
| 6,243,660 B1 | 6/2001 | Hsu et al. | |
| 7,538,686 B2 | 5/2009 | Yeh et al. | |
| 8,264,529 B2 | 9/2012 | Goulart et al. | |
| 2001/0049268 A1 | 12/2001 | Kobayashi | |
| 2003/0001018 A1 | 1/2003 | Hussey et al. | |
| 2003/0008692 A1* | 1/2003 | Phelan | 455/574 |
| 2003/0046700 A1 | 3/2003 | Wilcox et al. | |
| 2003/0132974 A1 | 7/2003 | Bodin | |
| 2004/0116074 A1* | 6/2004 | Fujii et al. | 455/41.2 |
| 2004/0146909 A1* | 7/2004 | Duong et al. | 435/6 |
| 2004/0174400 A1 | 9/2004 | Herigstad et al. | |
| 2004/0194028 A1 | 9/2004 | O'Brien | |
| 2005/0030201 A1* | 2/2005 | Bridgelall | 340/870.11 |
| 2005/0077356 A1* | 4/2005 | Takayama et al. | 235/451 |
| 2006/0022800 A1* | 2/2006 | Krishna et al. | 340/10.2 |
| 2006/0022815 A1* | 2/2006 | Fischer et al. | 340/505 |
| 2006/0084409 A1 | 4/2006 | Ghadiali | |
| 2006/0092072 A1 | 5/2006 | Steiner | |
| 2006/0227365 A1 | 10/2006 | Hohensee et al. | |
| 2006/0237537 A1* | 10/2006 | Empedocles et al. | 235/439 |

(Continued)

OTHER PUBLICATIONS

U.S. Appl. No. 13/611,983, by William Noah Schilit, filed Sep. 12, 2012.

(Continued)

*Primary Examiner* — Ayodeji Ayotunde
(74) *Attorney, Agent, or Firm* — Shumaker & Sieffert, P.A.

(57) ABSTRACT

In general, techniques and systems for selecting a read rate for short-range communication with a computing device are described. In one example, a method includes detecting, by a computing device, a trigger event. The method may also include, responsive to the detection of the trigger event, changing a near-field communication (NFC) read rate from a first read rate to a second read rate by multiplying the first read rate by a predetermined value. The method may also include generating, by the computing device, NFC signals at the second read rate. In some examples, the trigger event may include an acceleration or velocity of the computing device exceeding a threshold, detecting the computing device within a predetermined geographical location, or detecting an ambient light intensity exceeding a threshold.

24 Claims, 8 Drawing Sheets

(56) References Cited

U.S. PATENT DOCUMENTS

| | | | |
|---|---|---|---|
| 2006/0242607 A1 | 10/2006 | Hudson | |
| 2006/0261928 A1 | 11/2006 | Solberg et al. | |
| 2007/0096876 A1* | 5/2007 | Bridgelall et al. | 340/10.1 |
| 2007/0109124 A1* | 5/2007 | Park et al. | 340/572.1 |
| 2007/0124503 A1 | 5/2007 | Ramos et al. | |
| 2007/0145152 A1 | 6/2007 | Jogand-Coulomb et al. | |
| 2007/0176824 A1 | 8/2007 | Stumbo et al. | |
| 2007/0188444 A1 | 8/2007 | Vale et al. | |
| 2008/0021876 A1 | 1/2008 | Ahern et al. | |
| 2008/0042830 A1* | 2/2008 | Chakraborty et al. | 340/540 |
| 2008/0076505 A1* | 3/2008 | Nguyen et al. | 463/16 |
| 2008/0093447 A1 | 4/2008 | Johnson et al. | |
| 2008/0100439 A1* | 5/2008 | Rinkes | 340/572.1 |
| 2008/0167834 A1* | 7/2008 | Herz et al. | 702/150 |
| 2008/0262928 A1 | 10/2008 | Michaelis | |
| 2009/0044123 A1 | 2/2009 | Tilton et al. | |
| 2009/0051648 A1 | 2/2009 | Shamaie et al. | |
| 2010/0178900 A1* | 7/2010 | Cheng et al. | 455/414.1 |
| 2010/0184372 A1 | 7/2010 | Tabaaloute | |
| 2010/0214398 A1 | 8/2010 | Goulart et al. | |
| 2010/0280895 A1 | 11/2010 | Mottola | |
| 2010/0294840 A1 | 11/2010 | Barry | |
| 2011/0006885 A1* | 1/2011 | Park et al. | 340/10.3 |
| 2011/0018731 A1 | 1/2011 | Linsky et al. | |
| 2011/0083111 A1 | 4/2011 | Forutanpour et al. | |
| 2011/0185607 A1 | 8/2011 | Forster et al. | |
| 2011/0212688 A1 | 9/2011 | Griffin et al. | |
| 2011/0276511 A1 | 11/2011 | Rosenberg | |
| 2011/0320293 A1 | 12/2011 | Khan | |
| 2012/0029997 A1 | 2/2012 | Khan et al. | |
| 2012/0044059 A1 | 2/2012 | Saros et al. | |
| 2012/0045989 A1* | 2/2012 | Suumaki et al. | 455/41.1 |
| 2012/0084302 A1 | 4/2012 | Murdock et al. | |
| 2012/0094596 A1 | 4/2012 | Tysowski | |
| 2012/0094597 A1 | 4/2012 | Tysowski | |
| 2012/0094598 A1 | 4/2012 | Tysowski | |
| 2012/0150601 A1 | 6/2012 | Fisher | |
| 2012/0167146 A1 | 6/2012 | Incorvia | |
| 2012/0198504 A1 | 8/2012 | Tabaaloute | |
| 2012/0239760 A1 | 9/2012 | Sjarif et al. | |
| 2012/0242481 A1 | 9/2012 | Gernandt et al. | |
| 2012/0242846 A1 | 9/2012 | Iwase | |
| 2012/0245990 A1 | 9/2012 | Agarwal | |
| 2012/0317194 A1 | 12/2012 | Tian | |

OTHER PUBLICATIONS

U.S. Appl. No. 13/612,308, by William Noah Schilit, filed Sep. 12, 2012.

U.S. Appl. No. 13/612,169, by William Noah Schilit, filed Sep. 12, 2012.

U.S. Appl. No. 13/612,311, by Richard Carl Gossweiler III, filed Sep. 12, 2012.

U.S. Appl. No. 13/612,427, by Roy Want, filed Sep. 12, 2012.

U.S. Appl. No. 13/612,386, by Roy Want, filed Sep. 12, 2012.

Ballagas et al., "Sweep and Point & Shoot: Phonecam-Based Interactions for Large Public Displays", Extended Abstracts on Human Factors in Computing Systems, Apr. 2005, pp. 1200-1203.

Choi et al., "Beatbox Music Phone: Gesture-based Interactive Mobile Phone using a Tri-axis Accelerometer", IEEE International Conference on Industrial Technology, Dec. 2005, pp. 97-102.

Broll et al., "Mobile and Physical User Interfaces for NFC-based Mobile Interaction with Multiple Tags," MobileHCI' 10, Sep. 7-10, 2010, 10 pp.

* cited by examiner

VARIABLE READ RATES FOR SHORT-RANGE COMMUNICATION

This application claims the benefit of U.S. Provisional Application No. 61/594,206, filed Feb. 2, 2012, the entire content of each of which is incorporated herein by reference.

TECHNICAL FIELD

This disclosure relates to short-range communication using a computing device.

BACKGROUND

A user may interact with applications executing on a computing device (e.g., mobile phone, tablet computer, smart phone, or the like). For instance, a user may install, view, or delete an application on a computing device.

In some instances, a user may use a mobile computing device (e.g., mobile phone, tablet computer, smart phone, or the like) to communicate with other devices or systems. For instance, a user may transmit information from the mobile device to a remote computing device.

SUMMARY

In one example, a method includes detecting, by a computing device, a trigger event, responsive to the detection, changing a near-field communication read rate from a first read rate to a second read rate by multiplying the first read rate by a predetermined value, and generating, by the computing device, near-field communication signals at the second read rate.

In another example, a computer-readable storage medium is encoded with instructions that cause one or more processors of a computing device to perform operations comprising detecting a trigger event, responsive to the detection, changing a near-field communication read rate from a first read rate to a second read rate by multiplying the first read rate by a predetermined value, and generating near-field communication signals at the second read rate.

In another example, a computing device includes one or more processors configured to detect a trigger event and, responsive to the detection, change a near-field communication read rate from a first read rate to a second read rate by multiplying the first read rate by a predetermined value, and a near-field communication module configured to generate near-field communication signals at the second read rate.

The details of one or more aspects of this disclosure are set forth in the accompanying drawings and the description below. Other features, objects, and advantages of the disclosure will be apparent from the description and drawings, and from the claims.

DETAILED DESCRIPTION

Figure 1:
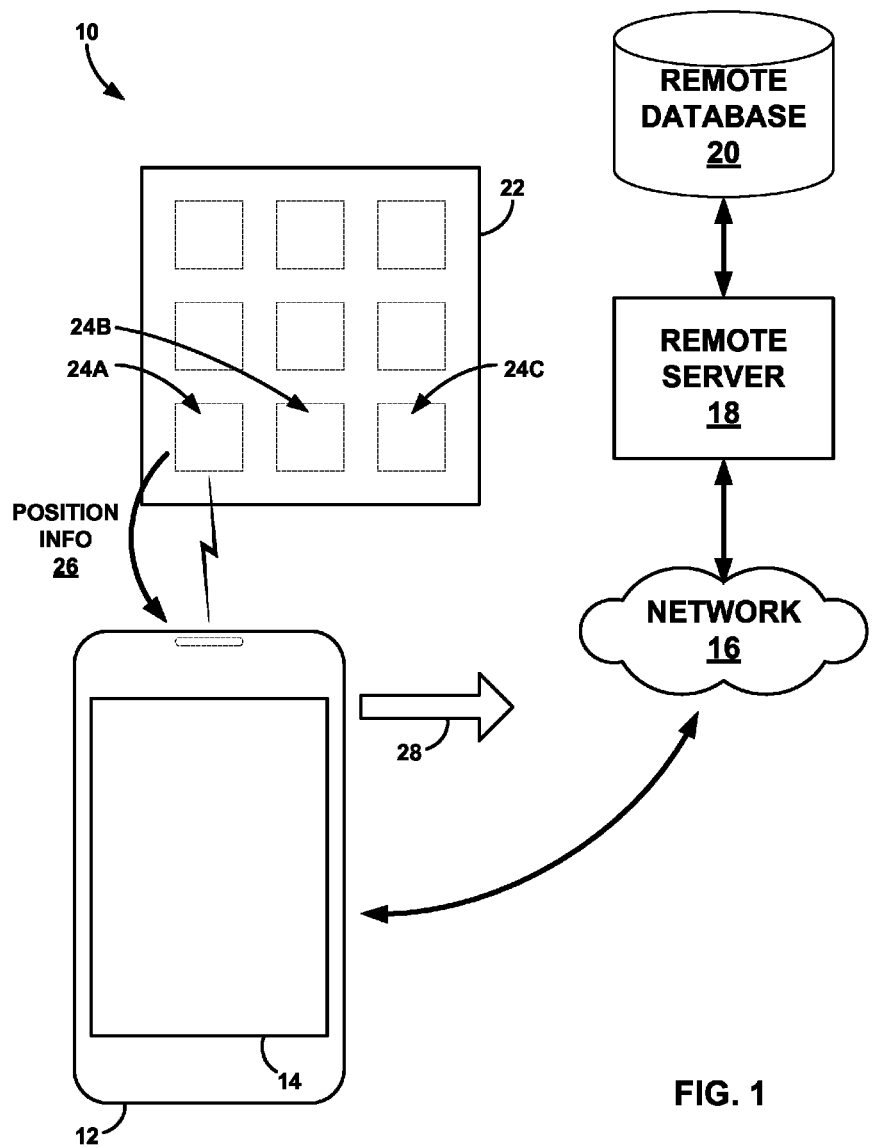
FIG. 1 is a conceptual diagram illustrating an example computing device that is configured to receive supplemental information based at least in part on position information obtained from a position device, in accordance with one or more aspects of the present disclosure.

In general, this disclosure is directed to techniques for automatically managing the read rate for short-range communication. Typically, a computing device (e.g., a mobile device) may include a short-range communication circuit that is capable of reading from and/or writing data to a short-range communication device. For example, the computing device may read or otherwise obtain data from a passive near-field communication (NFC) tag. The user of the computing device may manually turn the short-range communication circuit on or off as needed when the user desires to interrogate an NFC tag. Alternatively, the computing device may operate the short-range communication circuit with a constant read rate such that the computing device may obtain data from any NFC tag that comes within a communication range of the computing device during a read cycle.

In some examples, the user may desire to obtain data from multiple NFC tags, or other short-range communication devices, within a relatively short period of time. In other words, the user may be moving the computing device with respect to the NFC tags. Without increasing the read rate to account for the movement of the computing device, the computing device may not be capable of obtaining data from each of the multiple NFC tags as the computing device is moving. Operating the computing device with a sufficiently high read rate to account for computing device movement may consume unnecessary resources such as battery power and processing power when the computing device is not moving and/or not interrogating any NFC tags.

Techniques of this disclosure may, in various instances, enable a computing device to change the short-range communication (e.g., NFC) read rate on a dynamic or on-demand basis. An increase in read rate may increase the probability that the computing device will obtain data from short-range communication devices that come into proximity (e.g., the communication range) with the computing device while the computing device is moving or otherwise is in a situation in which short-range communication may occur. The computing device may also decrease the read rate when the computing device is not moving or otherwise in a situation in which short-range communication is unlikely to occur. By dynamically increasing or decreasing the short-range communication read rate, the computing device may provide increased short-range communication performance when needed and limit power consumption with low read rates when short-range communication may not be needed.

The computing device may automatically increase the short-range communication read rate in response to a detected trigger event. Example trigger events may include a sensed value (e.g., an acceleration, a velocity, or an ambient light level) exceeding a threshold. Other trigger events may include detecting a short-range communication device (e.g., obtaining data from an NFC tag), a predetermined geographical location, or a predetermined time of day. The computing device may thus dynamically increase or decrease the short-range communication read rate as a sensed value changes over time. The computing device may immediately increase the read rate in response to detecting one or more trigger events. Conversely, the computing device may decrease the read rate in response to detecting a different trigger event (e.g., a sensed value that drops below a threshold, a time period that elapses, the beginning of a decrease schedule, or any other indication that the read rate should be decreased).

In some examples, the computing device may match read rate changes to changes in the computing device velocity or other sensed parameter. For example, the computing device may store a lookup table or set of equations that associates sensed parameter values to respective read rates. In this manner, the computing device may perform several read rate adjustments based on the sensed parameter value. As will be described herein, a computing device may achieve short-range communication read rates sufficient to obtain data from multiple short-range communication devices during a sweep or gesture of the computing device over an array of short-range communication devices (e.g., NFC tags). Such an array of devices may be provided to interact with a poster or other media source.

FIG. 1 is a conceptual diagram illustrating an example computing device 12 that is configured to receive supplemental information based on position information 26 obtained from at least one of position devices 24A, 24B, and 24B (collectively "position devices 24). As shown in FIG. 1, system 10 includes computing device 12, visual media 22, position devices 24, network 16, remote server 18, and remote database 20. Computing device 12, in some examples, is or is a part of a portable computing device (e.g., a mobile phone, a netbook, a notebook, or a tablet device). In other examples, computing device 12 may be at least a part of a digital camera, a music player, or any other device that a user may carry or move between different locations. Computing device 12 may also connect to network 16 (e.g., a wired or wireless network).

Computing device 12 may include a short-range communication module (not shown) capable of initiating wireless communication with position devices 24, over a relatively short distance. For example, this short distance may be less than approximately 10 meters, less than approximately 1 meter, or even less than approximately 10 centimeters. In some examples, computing device 12 may only initiate communication with one of position devices 24 when computing device 12 is within, e.g., 5 centimeters or even 2.5 centimeters of one of position devices 24. In this example, a user may place computing device 12 directly over or even touching visual media 22 such that computing device 12 may communicate with a position device at that particular location of computing device 12.

The short distance required for short-range communication may be selected based on the application of identification devices 24. In other words, shorter distances may be used when identification devices are closer together to so that each of the identification devices may be uniquely distinguishable from each other. In addition, the user may benefit from being aware that control information 26 may be obtained from an identification device 24. For example, computing device 12 may request that the user confirm that short-range communication is to occur (e.g., receive a confirmation input). If the user moves computing device 12 across visual media 22, computing device 12 may communicate with different position devices 24 as computing device 12 is moved. The read rate of computing device 12 may be dynamically changed, as described herein, based on one or more trigger events.

As shown in FIG. 1, position devices 24 are arranged in an array behind visual media 22. The array of position devices 24 may be arranged with any number of devices and in pattern, such as grids, rows, arcs, circles, diagonals, and the like. In other examples, system 10 may include only one position device 24. Since each position device 24 may be relatively simple and configured to communicate with any number of computing devices, computing device 12 may be capable of establishing communication with hundreds, thousands, or even millions of different position devices (associated with visual media 22 or not).

As described herein, position devices 24 may be capable of short-range communication. One example of short-range communication is near-field communication (NFC). NFC communication can occur between two devices in different modes. For example, computing device 12 may operate in at least two different modes to communicate with position devices 24 using NFC. For example, computing device 12 and position devices 24 may be configured to operate in a passive mode and an active mode of operation. In an active mode of operation, computing device 12 may generate a first alternating magnetic field that is received by one of position devices 24 in physical proximity to computing device 12. In response, position device 24 may generate a second alternating magnetic field that is received by computing device 12. In this way, data may be communicated between computing device 12 and position device 24 such as using peer-to-peer communication. In the active mode, computing device 12 may also power or activate a passive device to retrieve data from the passive device, as further described below. In this manner, each of position devices 24 may include passive near-field communication hardware.

In a passive mode of operation, load modulation techniques may be employed to facilitate data communication between computing device 12 and position devices 24. In a passive mode, position devices 24 do not actively generate an alternating magnetic field in response to the alternating magnetic field of computing device 12, but only as a result of the induced voltage and applied load at the receiver or antenna of identification device 24. Instead, position devices 24 may include electrical hardware (e.g., an NFC module) that generates a change in impedance in response to the alternating magnetic field generated by computing device 12. For example, computing device 12 may generate an alternating magnetic field that is received by one or more position devices 24. Electrical hardware in position device 24 may generate a change in impedance in response to the alternating magnetic field. The change in impedance may be detected by the NFC module of computing device 12. In this way, load modulation techniques may be used by computing device 12 to obtain position information 26 from each of position devices 24. In other words, computing device 12 may obtain position information 26 from one of position devices 24, but the position device would not receive any data from computing device 12 in the passive mode. Other well-known modulation techniques including phase modulation and/or amplitude modulation of the applied signal resulting from load modulation may also be employed to facilitate data communication between computing device 12 and position device 24 in other examples.

Generally, each of position devices 24 may operate in passive mode. In passive mode, position devices 24 may be referred to as NFC tags or NFC targets. In other words, computing device 12 may include active NFC hardware and position devices 24 may include passive NFC hardware. Since a passive position devices 24 do not need a dedicated power supply, position devices 24 may be placed in a variety of locations, on any surface, or even as part of smaller items. For example, position devices 24 may be embodied as a sticker or adhesive poster that is placed on the wall of a building or on a mounting surface to which visual media 22 is attached. Passive position devices 24 may also be less expensive and more difficult to corrupt with computing device 12. In this manner, position devices 24 may include electrical hardware that generates a change in impedance in response to an alternating magnetic field. However, each of position devices 24 may be another computing device in other examples. For example, position devices 24 may each be a computing device that operates in a passive NFC mode and/or an active NFC mode. In other words, position devices 24 may include active NFC hardware. This active NFC hardware may be configured to emulate passive NFC hardware or participate in active near-field communication.

In an example of a passive position device 24, position devices 24 may each deliver position information 26 to computing device 12 in response to receiving an alternating magnetic field generated by the NFC module of computing device 12. In other words, position information 26 may be unique data stored on each of the respective position devices 24. Upon receiving the alternating magnetic field (e.g., receiving power sufficient to transmit data) computing device 12 may receive position information 26. In this manner, position device 24 may only be capable of delivering or sending position information 26 when computing device 12 is within close physical proximity to each respective position device 24. Although the user may physically touch, bump, or tap computing device 12 to position devices 24, computing device 12 may be capable of receiving position information 26 from position devices 24 without physically touching position devices 24.

Computing device 12 may communicate with short-range communication devices (e.g., position devices 24) for any number of reasons and for a variety of purposes. For example, computing device 12 may receive information regarding the location of computing device 12, advertising material, a web-address for accessing information, or control of an electronic device. In the example of FIG. 1, computing device 12 may obtain position information 26 from one or more of position devices 24 to retrieve supplementary information associated with a portion of visual media 22. Computing device 12 may benefit from dynamically increasing the short-range communication read rate in order to obtain position information 26 from each of position devices 24 that come into range with computing device 24.

Visual media 22 may be any structure that provides visual information to a user. For example, visual media 22 may be a printed poster, printed flyer, coated surface, electronic media (e.g., a liquid crystal display), or any other surface that includes visual information such as text, numbers, images, and the like. Visual media 22 may be directed to a single subject (e.g., a movie advertisement or a restaurant menu), or visual media 22 may include multiple subjects (e.g., different store advertisements or coupons). In any case, visual media 22 may be changed over time while each of position devices 24 may include the same position information 26 over time. Alternatively, visual media 22 may take the form of a weekly sales poster, an interactive item list for adding items to a shopping list, a building directory, or even photos of different people. Obtaining position information from any position devices associated with any of these items within visual media 22 may prompt remote server 18 to transmit supplemental information associated with the item of visual media 22.

Position information 26 may include the relative position of that particular one of position devices 24 (e.g., position device 24A) transmitting the position information within the array of position devices. In other words, position information 26 may be different from each of position devices 24. Since the position information for each of position devices 24 may be unique from each other, the position information may be used to identify the particular portion of visual media 22 over which computing device 12 has been placed by the user. Although position information 26 may include a unique position of the respective position device 24, all position devices 24 associated with visual media 22 may include the same information that indicates the association with visual media 22. Position devices 24 may be located in front of, attached to, behind, or otherwise near visual media 22.

An array of position devices 24 may be provided to indicate over which area of visual media 22 computing device 12 is located. Thus, each of position devices 24 may be registered or mapped to a respective portion of visual media 22 using a networked service (e.g., remote server 18 and remote database) or other system. Position information 26 may include any data that may be used by computing device 12 and/or transmitted to remote server 18 to identify the respective portion of visual media 22. In addition, certain portions of visual media 22 may be associated with supplemental information stored by remote database 20. The combination of position devices 24 and visual media 22 may be termed a "Smart Poster" because the poster is able to direct computing device 12 to additional information not presented by the visual information on visual media 22. The additional, or supplemental, information may be stored by remote server 18 and delivered to any computing device 12 that requests the supplemental information.

By merely moving computing device 12 over a desired portion of visual media 22, the user may thus obtain and transmit position information 26 to remote server 18 via network 16. Network 16 may be any wired or wireless network that allows computing device 12 to access another computing device and/or the Internet. Remote server 18 may then retrieve the supplemental information associated with the unique position device identified by position information 26 and transmit the supplemental information back to computing device 12 for presentation to the user. The supplemental information may be more detailed, more recently updated, or provide interactive information that would otherwise be unavailable on visual media 22. For example, the supplemental information may include links to purchase an item, coupons, or upcoming scheduled events for the subject matter of the visual media 22. In other words, the supplemental information may be managed by a central server (e.g., remote server 18), a central database (e.g., remote database 20), or any web-based resource. In this manner, the effectiveness of system 10 in providing the user with the desired supplemental information associated with visual media 22 may depend upon the ability of computing device 12 to obtain position information 26 from each of position devices 24.

User interface 14 may include an input device and an output device so that the user can communicate with computing device 12. In one example, user interface 14 may be a touch screen interface. In other examples, user interface 14 may include a display and one or more buttons, pads, joysticks, mice, or any other device capable of turning user actions into electrical signals that control computing device 12. In addition, computing device 12 may include one or more microphones, speakers, cameras, or tactile feedback devices to deliver information to the user or receive information. In any example, the user may interact with user interface 14 to provide input before, during, and/or after interaction with position devices 24. For example, user interface 14 may present supplemental information associated with visual media 22 to the user. User interface 14 may also, in some examples, present an indication of the short-range communication read rate.

Remote server 18 and remote database 20 may each include one or more servers or databases, respectively. In this manner, remote server 18 and remote database 20 may be embodied as any hardware necessary to receive position information 26, store the association between position devices 24 and visual media 22, or transmit supplemental information to computing device 12 over network 16. Remote server 18 may include one or more desktop computers, mainframes, minicomputers, or other computing devices capable of executing computer instructions and storing data. Remote database 20 may include one or more memories, repositories, hard disks, or any other data storage device. In some examples, remote database 20 may be included within remote server 18.

Remote server 18 may connect to network 16. Network 16 may be embodied as one or more of the Internet, a wireless network, a wired network, a cellular network, or a fiber optic network. In other words, network 16 may be any data communication protocol that facilitates data between two or more devices.

In some examples, remote database 20 may include Relational Database Management System (RDBMS) software. In one example, remote database 20 may be a relational database and accessed using a Structured Query Language (SQL) interface that is well known in the art. Remote database 20 may alternatively be stored on a separate networked computing device and accessed by remote server 18 through a network interface or system bus. Remote database 20 may in other examples be an Object Database Management System (ODBMS), Online Analytical Processing (OLAP) database or other suitable data management system.

As identified above, the short-range communication read rate of computing device 12 may be changed, modified, varied, or adjusted to support various uses by the user (e.g., obtaining position information 26 from each of position devices 24). In one example, computing device 12 may include one or more processors (e.g., processors 40 of FIG. 2) configured to detect a trigger event. Responsive to the detection of the trigger event, the processor may change a near-field communication (NFC) read rate from a first read rate to a second read rate. The change may be made by multiplying the first read rate by a predetermined value, looking up the change associated with the trigger event, or such that the second read rate reaches a predetermined value (e.g., greater than 4 Hz or at least 10 Hz). In addition, computing device 12 may include an NFC module (e.g., a short-range communication module) configured to generate NFC signals at the second read rate. In this manner, computing device 12 may be configured to dynamically increase or decrease the read rate to account for trigger events that may indicate computing device 12 requires a different read rate. When increasing the read rate, the increased read rate may be increased over a default read rate, a low read rate, or even a disabled NFC module. When decreasing the read rate, the decreased read rate may be decreased back to a default read rate or a low read rate, for example.

In another example, computing device 12 may utilize a computer-readable storage medium encoded with instructions that cause one or more processors of a computing device to perform operations. These operations may include detecting a trigger event, and responsive to the detection, changing (e.g., increasing or decreasing) a near-field communication read rate from a first read rate to a second read rate. In one example, the second read rate may be greater than or equal to 4 Hz, but other read rates may also be performed by the one or more processors. The instructions may also cause the one or more processors to generate NFC signals at the second read rate. The one or more processors may command an NFC module to generate the NFC signals. In this manner, the instructions may cause the one or more processors to dynamically increase the NFC read rate over a lower (e.g., default or minimal read rate) in response to the trigger event.

The trigger event that causes computing device 12 to increase, or otherwise dynamically vary, the read rate for short-range communication may take the form of many different types of events. Although read rates may generally be increased in response to detecting a trigger event, read rates may decrease in response to detecting a trigger event in some examples. In one example, the trigger event may include a value sensed by computing device 12 exceeding a threshold. Computing device 12 may include one or more sensors configured to sense or detect a condition of computing device 12 or how computing device 12 relates to the surrounding environment. For example, computing device 12 may include one or more accelerometers, gyroscopes, mercury switches, image sensors, light sensors, global positioning devices, compasses, or temperature sensors. Each of these sensors may generate an output signal that is a value of the particular parameter the sensor measures or senses. When computing device 12 determines that a value from the sensor exceeds a pre-determined threshold or set of thresholds, computing device 12 may generate a trigger event for adjusting the short-range communication read rate. In some examples, computing device 12 may utilize two or more sensors to generate a more accurate representation of the movement of computing device 12 (e.g., a gesture from a combination of sensors with 9 degrees of freedom). The more accurate representation of movement may then be compared with one or more gestures to determine when to increase the short-term communication read rate.

For example, computing device 12 may include a three-axis accelerometer. In other examples, one or more single- or two-axis accelerometers may be utilized by computing device 12 instead. The sensed value from the accelerometer may thus be an acceleration or a velocity of computing device 12 (e.g., movement of computing device 12 in the direction of arrow 28). The acceleration value is an indication of changes to the movement of computing device 12. The acceleration may be calculated as the magnitude of the vector sum of each axis of a three-axis accelerometer, for example. Increased acceleration values exceeding the threshold may indicate that the user is moving computing device 12 such that an increased read rate may be beneficial to obtain information from each of position devices 24 that passes near computing device 12. Alternatively, increased acceleration values may be the result of a gesture or action from the user that indicates short-range communication is to occur. For example, a user may shake computing device 12 to generate the trigger event and cause computing device 12 to increase the read rate. The increased read rate may then continue until a time period elapses.

Likewise, increased velocity values exceeding the threshold may indicate that the user is moving computing device 12 with sufficient velocity that a higher read rate may increase the likelihood that position information 26 will be obtained from each of position devices 24 passing near computing device 12. In this manner, as computing device increases its velocity in the direction of arrow 28 across position devices 24, increasing the read rate may increase the likelihood that computing device 12 is capable of obtaining position information 26 from each of position devices 24A, 24B, and 24C.

One or more thresholds may be set for the sensed value of a parameter (e.g., an acceleration or velocity). Each threshold may define when computing device 12 changes from one short-range communication read rate to another read rate. For example, computing device 12 may compare the sensed value of an acceleration parameter to a single threshold to toggle between a low read rate (e.g., approximately 1 Hz) and a high read rate (e.g., approximately 10 Hz). In some examples, the low read rate may be lower than 1 Hz and/or the high read rate may be higher than 10 Hz. In other examples, computing device 12 may compare the sensed value of an acceleration or velocity parameter to two thresholds to toggle between three different read rates (e.g., a low, medium, and high read rate). In this manner, any time the sensed value of the parameter crosses one of the thresholds, a trigger event is created that causes computing device 12 to adjust the read rate. In some examples, three or more thresholds may be employed to dynamically adjust the read rate based on the sensed value of the parameter.

The thresholds used to generate trigger events may be stored in a memory of computing device 12. In some examples, the thresholds may be pre-selected based on various hardware and/or software specifications of computing device 12. In other examples, the thresholds may be selected based on usage of computing device 12. For example, one or more thresholds may be set at higher values of the parameter to conserve battery power. Conversely, one or more thresholds may be set at lower values of the parameter to provide greater performance (e.g., higher read rates with smaller movements of computing device 12).

Although computing device 12 may store thresholds and detect trigger events for adjusting the read rate, remote server 18 may store thresholds in remote database 20 and/or detect trigger events for computing device 12. In this manner, computing device 12 may transmit sensed values to remote server 18 via network 16 and subsequently receive trigger events when a sensed value exceeds a threshold stored in remote database 20. Computing device 12 and remote server 18 may each contribute to the dynamic adjustment of read rates in other examples.

In some examples, computing device 12 may monitor a parameter value for predetermined combinations or patterns of the sensed parameter value before increasing or decreasing the read rate. For example, computing device 12 may detect a plurality of accelerations over a predetermined period of time such that the trigger event is a predetermined pattern of the plurality of detected acceleration values. A predetermined pattern of acceleration values may be used as a type of filter to identify only those instances when a user may be attempting to obtain information from a short-range communication device. If a user carries computing device 12, computing device 12 may be subject to a variety of accelerations when the user is riding in a car, walking, running, providing input to the phone, or otherwise moving computing device 12. Although these movements may translate into an acceleration that exceeds one or more thresholds, the movements may also not be indicative of a need for an increased read rate.

Instead of a threshold, computing device 12 may thus compare sensed parameter values (e.g., an acceleration of a velocity) over time to one or more predetermined pattern of parameter values. The pattern may be a sequence of parameter value magnitudes, directions, duration of certain magnitudes or directions, frequency of changes to the parameter value, and/or a number of times the parameter value reaches a threshold within a period of time. The pattern of values may be stored on computing device 12 or remote database 20, and the pattern of values may be determined based on previous computing device movements when information was obtained from one or more short-range communication devices. Alternatively, the pattern may be determined from studied user motions when obtaining information. In some examples, these patterns may be representative of relatively long sweeping motions or non-random motions associated with an attempt by a user to place computing device 12 in close proximity to one or more short-range communication devices. Computing device 12 may thus use the patterns to differentiate between motions unrelated to short-range communication and motions related to short-range communication.

In other examples, the sensed value may be associated with one of a geographical position of computing device 12, an ambient light intensity, or a docking magnet. Computing device 12 may include a global positioning system (GPS) device that generates a value (e.g., a latitude and longitude) based on the position of computing device 12. Computing device 12 may store one or more geographical regions that correlate with a known array of position devices 24 (or other short-range communication devices). Since the user may desired to obtain information from position devices 24 in these geographical regions, the sensed value from the GPS device may be a trigger value that causes computing device 12 to increase the short-range communication read rate. Computing device 12 may thus compare the sensed GPS coordinates and compare them to the stored regions. In other examples, computing device 12 may transmit the sensed GPS values to remote server 18. Remote server 18 may then compare the transmitted GPS values to stored geographical regions in remote database 20 and determine trigger events based on the comparisons. Remote server 18 may then transmit the trigger event and/or updated read rates to computing device 12.

In some examples, computing device 12 may include a light sensor that senses the intensity of ambient light surrounding computing device 12. When the intensity of the detected ambient light exceeds a pre-determined threshold, computing device 12 may increase the short-range communication read rate. For example, a user may carry computing device 12 in a pocket, bag, or other enclosed space that does not receive much light. When computing device 12 is in such a location, the user may not be attempting to obtain position information 26 from position devices 24, for example. Since the ambient light intensity may be relatively low in these spaces in comparison with open spaces in which the user may interact with computing device 12, the short-range communication read rate may be set to a low rate or even turned off. When computing device 12 senses that the ambient light intensity exceeds one or more thresholds, computing device 12 may subsequently increase the read rate such that computing device 12 may obtain information from short-range communication devices.

In another example, computing device 12 may include a magnetic sensor that is configured to detect when a magnet is in the vicinity of computing device 12. For example, a recharge dock, car dock, or other cradle designed to accept computing device 12 may include a magnet that is detectable by computing device 12. When a sensor of computing device 12 detects the magnet, computing device 12 may interpret the presence of the magnet as an indication that computing device 12 may not be communicating with any short-range communication devices. Therefore, computing device 12 may increase the read rate whenever the magnet is not detected (e.g., computing device 12 is potentially moving). In addition, computing device 12 may turn off or disable the short-range communication device (e.g., the read rate is zero) when computing device 12 is in a locked state.

In alternative examples, the trigger event may include receiving information from a near-field communication device (NFC device) or other short-range communication device. In other words, detection of one NFC device (e.g., position device 24A) may indicate that it is likely another NFC device may be located in close proximity. Therefore, computing device 12 may increase the read rate when information is obtained from an NFC device. In some examples, detecting multiple NFC devices (e.g., obtaining information from multiple NFC devices within a time period) may be a trigger event for computing device 12 to further increase the short-range communication read rate. In this manner, computing device 12 may be responsive to a user beginning to detect NFC devices in an array of NFC devices such as position devices 24.

In some examples, computing device 12 may adjust the read rate (e.g., increase the read rate) in response to the output from two or more sensors. In one example, computing device 12 may monitor these two or more sensors whenever the output from one of the sensors exceeds its respective threshold or a trigger event is otherwise detected. In another example, the trigger event detected by computing device 12 may require both a first sensed value exceeding a first threshold from a first sensor and a second sensed value exceeding a second threshold from a second sensor, wherein the first sensor is different from the second sensor. In this manner, computing device 12 may only adjust the read rate when the sensed value from multiple sensors indicates that the read rate should be adjusted. In other examples, the trigger event may include the output from a single sensor and a command from an application.

A trigger event that includes a sensed value from two or more sensors exceeding their respective thresholds may act as a confirmation that the read rate is to be increased or decreased. In other words, multiple parameters values exceeding their respective thresholds may prevent the read rate from changing due to an outlier or unpredictable situation for computing device 12. In another example, one sensor may provide erroneous data or otherwise malfunction. The second sensor may thus be a backup sensor for adjusting the short-range communication read rate.

Alternatively, a trigger event that includes multiple parameter values exceeding respective thresholds may indicate a greater increase to the read rate than would be otherwise performed due to a single parameter value exceeding its threshold. Thus, computing device 12 may use the output from multiple sensors as a compounding effect or multiplier on the magnitude of the increase (or decrease) to the short-range communication read rate. For example, computing device 12 may adjust the read rate according to a count system. For each parameter value that exceeds its respective value, computing device 12 may increase the count by one. Each time the count increases, computing device 12 may iteratively increase the read rate. Since a greater number of parameter values exceeding their threshold may increase the likelihood that short-range communication is to occur, higher read rates may benefit the user in obtaining information from each short-range communication device.

In some examples, the trigger event detected by computing device 12 may include receiving a command from an application executing at the computing device. This command received by computing device 12 may instruct computing device 12 to increase the short-range communication (e.g., NFC) read rate. Although the command may merely instruct computing device 12 to increase the read rate based on separate instructions for increasing the read rate, the command may, in other examples, define the increased read rate for computing device 12. Since some software applications may utilize short-range communication (e.g., an application that controls receiving position information 26 from position devices 24), these software applications may command a processor of computing device 12 to increase the read rate when the application begins or when the application anticipates the user attempting to obtain information from a short-range communication device.

In this manner, the trigger event may be an event other than a sensed value from a sensor of computing device 12. The application executing on computing device 12 may determine when to generate the command for increasing (or decreasing) the read rate using a variety of indicators. For example, the application may monitor sensed values from one or more sensors, identify when the user provides input to obtain information from short-range communication devices (e.g., position devices 24), determine when a short-range communication device has been detected, or a change to the read rate would otherwise benefit the execution of the application. Alternatively, remote server 18 may transmit a command to computing device 12 for increasing or decreasing the short-range communication read rate. Since computing device 12 may utilize a web-based application for performing one or more functions, the web-based application may be executing on remote server 18 and utilize data transmitted between computing device 12 and remote server 18 over network 16. When remote server 18 either identifies that the read rate is inadequate for obtaining position information 26 from position devices 24, for example, remote server 18 may transmit a command to computing device 12 to adjust the read rate accordingly.

As described herein, computing device 12 may adjust the short-range communication read rate between three or more read rates. For example, computing device 12 may increase the read rate from a first read rate (e.g., a low read rate) to a second read rate (e.g., a medium read rate) upon detecting a first trigger event. Computing device may then detect one or more second trigger events. In response to detecting the one or more second trigger events, computing device 12 may increase the NFC read rate to a third read rate (e.g., a high read rate) that is greater than the second read rate. Computing device 12 may then generate NFC signals at the third read rate. In this manner, computing device 12 may adjust between three or more different read rates based on the trigger event detected.

When computing device 12 increases a short-range communication (e.g., NFC) read rate, computing device 12 may increase the read rate in a single step between the current read rate and the new read rate. This single step maybe relatively instantaneous once computing device 12 commands the increase in read rate. Alternatively, computing device 12 may ramp or otherwise increase the read rate over a period of time. For example, computing device 12 may increase the NFC read rate according to a step-wise function between a first read rate and a second read rate. This step-wise function may be based on a number of required steps between the first and second read rate, a maximum read rate difference between each of the steps, or a duration of time for the step-wise function to complete. In another example, computing device 12 may increase the NFC read rate according to a linear or exponential function between the first read rate and the second read rate.

In addition to increasing the short-range communication read rate, computing device 12 may decrease the read rate. For example, computing device 12 may detect a trigger event and, responsive to detecting the trigger event, decrease the short-range communication (e.g., NFC) read rate. The trigger event may, in some examples, be the inverse of a trigger event used to increase the read rate. In other words, the trigger event may include a sensed value falling below the respective threshold. Computing device 12 may thus be configured to detect different trigger event for increasing the read rate and decreasing the read rate. The different trigger event may share a common threshold to monitor the value in comparison to the threshold. In other examples, the threshold for increasing the read rate may be different than the threshold for decreasing the read rate. For example, the threshold for increasing the read rate based on a velocity value may be higher than the threshold for decreasing the read rate.

Instead of, or in addition to, monitoring an acceleration or velocity of computing device 12, computing device 12 may detect the trigger event when computing device 12 detects one of a geographical location of computing device 12, a predetermined time of day, or an ambient light level below a light threshold. For example, when computing device 12 detects that computing device 12 is no longer within a location at which an increased read rate is needed, computing device 12 may decrease the read rate. In another example, computing device 12 may decrease the read rate when a predetermined time of day is detected. For example, computing device 12 may decrease the read rate at night when the user is sleeping and not using computing device 12. In an alternative example, computing device 12 may decrease the read rate when computing device 12 detects that the ambient light level falls below a light thresholds (e.g., an intensity of light). When computing device 12 detects low ambient light levels, computing device 12 may interpret that computing device 12 is within a pocket or bag of the user and not needed to obtain information from any short-range communication device. In another example, the trigger event may be an expiration of a time period or a timeout when position information 26 has not been obtained. In other words, computing device 12 may decrease the read rate because the longer period of time without short-range communication may indicate that it is less likely short-range communication will occur. Computing device 12 may employ one or a combination of these trigger events to decrease the read rate.

After computing device 12 determines that the read rate is to be decreased, computing device 12 may decrease the read rate over a period of time (e.g., according to a decrease schedule). For example, computing device 12 may decrease the NFC read rate according to one of an exponentially decreasing schedule or a step-wise decreasing schedule. In this manner, the read rate may fall over a period of time to support an increased ability for computing device 12 to obtain information from a short-range communication device (e.g., one of position devices 24). The exponentially decreasing schedule may be based on a period of time for the decrease, the difference between the two read rates, or any other factor. Likewise, the step-wise decreasing schedule may be based on a number of required steps between the read rates, a maximum read rate difference between each of the steps, or a duration of time for the step-wise schedule to complete. Other types of decreasing read rate schedules are also contemplated.

In other examples, computing device 12 may detect the trigger event when computing device 12 detects an elapsed time period subsequent to increasing the read rate. Alternatively, computing device 12 may detect the trigger event when computing device 12 detects an elapsed time period within which information is not received from a near-field communication device. The time period may thus run from when the read rate was increased and/or when computing device does not receive any data via short-range communication. In other words, computing device 12 may employ a time out or other time-based limitation to the duration of time in which computing device 12 may operate with the increased read rate. Generally, the elapsed time period may be between approximately 1.0 second and 30 minutes. In one example, the elapsed time period may be between approximately 10 seconds and 5 minutes. However, computing device 12 may wait less than 1.0 seconds or greater than 30 minutes to decrease the read rate in other examples. Although the time period for decreasing the read rate may begin upon increasing the read rate, the time period may begin upon detecting a trigger event in some examples.

In addition, computing device 12 may employ a combination of a decrease schedule and an elapsed time period. For example, computing device 12 may wait for the time period to elapse and then decrease the read rate according to a selected decrease schedule. This combination, or a combination of other features described herein, may be employed by computing device 12 to dynamically adjust the read rate.

Although a trigger event may include a situation in which a sensed value of a parameter exceeds a threshold, the trigger event may encompass broader events. For example, detecting the trigger event may include detecting a velocity of computing device 12 over a time period. Computing device 12 may then increase the short-range communication read rate as the velocity increases during the time period. In addition, or instead, computing device 12 may decrease the read rate as the velocity decreases during the time period. In this manner, computing device 12 may increase or decrease the read rate according to any changes to the velocity (or any other parameter sensed by a sensor of computing device 12). Computing device 12 may compare the velocity value to an equation or lookup table stored in a memory of computing device 12 to make such dynamic changes.

Alternatively, computing device 12 may make dynamic changes to the read rate after detecting a trigger event. For example, computing device 12 may, via one or more sensors, sense a value of a parameter subsequent to detecting the trigger event. As described herein, computing device 12 may increase the read rate from a first read rate to a second read rate in response to the trigger event. This parameter may be, in some examples, one of an acceleration or a velocity of computing device 12. Computing device 12 may then select a third read rate based on the sensed value. The third read rate may be different than the first and second read rate. Although the third read rate may be greater than the second read rate, the third read rate may be lower than the second read rate in some examples. In this manner, computing device 12 may increase or decrease the read rate by selecting the third read rate.

Computing device 12 may determine the third read rate subsequent to the trigger event by retrieving the third read rate from one of an equation or a lookup table stored in a memory of computing device 12. The equation or lookup table may associate the sensed value of the parameter to a plurality of read rates. The equation may be a single equation or a set of equations based on parameter values, available read rates, and/or hardware or software limitations. In some examples, the equation may employ a multiplier that multiplies a base read rate by a factor. The factor may be a predetermined value or a factor of the sensed value. The lookup table may perform the same function as an equation without computing device 12 performing any calculations. Computing device 12 may select the read rate that is the closest match to the sensed value or the read rate corresponding to a range of parameter values in which the sensed value falls. After computing device determines the third read rate, computing device 12 may generate short-range communication signals at the determined third read rate. Computing device 12 may continue to select read rates in this fashion until a terminate event is detected and/or a time period has elapsed.

In some examples, the change to the short-range communication read rate (e.g., the increase or decrease to the read rate) may be determined by multiplying a currently used read rate by a predetermined value (e.g., a multiplier). Generally, the predetermined value may be between approximately 0.05 and 0.99 to decrease the read rate and between approximately 1.01 and 20.0 to increase the read rate. In one example, computing device 12 may increase the read rate by using a predetermined value of the multiplier between approximately 2.0 and 10.0. In another example, computing device 12 may decrease the read rate by using a predetermined value of the multiplier between approximately 0.1 and 0.9. Predetermined values greater or lower than these example values may also be used to adjust the read rate.

The short-range communication read rates described herein may be within certain ranges. For example, computing device 12 may employ a short-range communication read rate generally between approximately 0.1 Hz and approximately 20 Hz. In another example, the read rate may be between approximately 0.5 Hz and 10 Hz. In one example, computing device 12 may change the short-range communication read rate between approximately 1.0 Hz (a low or default read rate) and approximately 8 Hz (a high read rate). In another example, computing device 12 may increase the read rate to at least approximately 4.0 Hz from an initial read rate lower than 1.0 Hz. However, the first read rate may be less than or greater than any of these example read rates. In addition, when short-range communication is disabled, the read rate may be zero Hz.

In other examples, the short-range communication read rate may be expressed in terms of the duty cycle used for short-range communication. In other words, the read rate may change based on the percentage of the duty cycle in which computing device 12 is reading (e.g., the read duration) or otherwise obtaining position information 26 from the specific position device. For example, the read duration may be between approximately 5 percent and approximately 100 percent of the duty cycle. In other examples, the read duration may be between approximately 10 percent and approximately 80 percent of the duty cycle. The read duration needed to obtain position information 26 may thus determine the maximum read rate at approximately 100 percent duty cycle. For example, if the read duration is approximately 100 milliseconds (ms) and the duty cycle is set to approximately 100 percent, the read rate may be approximately 10 Hz. In other examples, the read duration may be between approximately 50 ms and 200 ms. However, the read duration may be lower or higher in other examples depending on the sensitivity of the components of computing device 12, design of short-range communication devices, and other factors related to short-range communication.

Various aspects of the disclosure may be operable only when the user has explicitly enabled such functionality. In addition, various aspects of the disclosure may be disabled by the user. Thus, a user may elect to prevent computing device 12 from increasing the short-range communication read rate, transmitting position information 26 to remote server 18, or receiving supplemental information directly from remote server 18. The user may also be able to turn off the short-range communication module of computing device 12 in some examples. In some examples, computing device 12 may limit the short-range communication read rate to avoid a power denial of service attack from malware that may attempt to drain the battery of computing device 12 with very high read rates. More generally, privacy controls may be applied to all aspects of the disclosure based on a user's privacy preferences to honor the user's privacy preferences for opting in or opting out of the functionality described in this disclosure.

Figure 2:
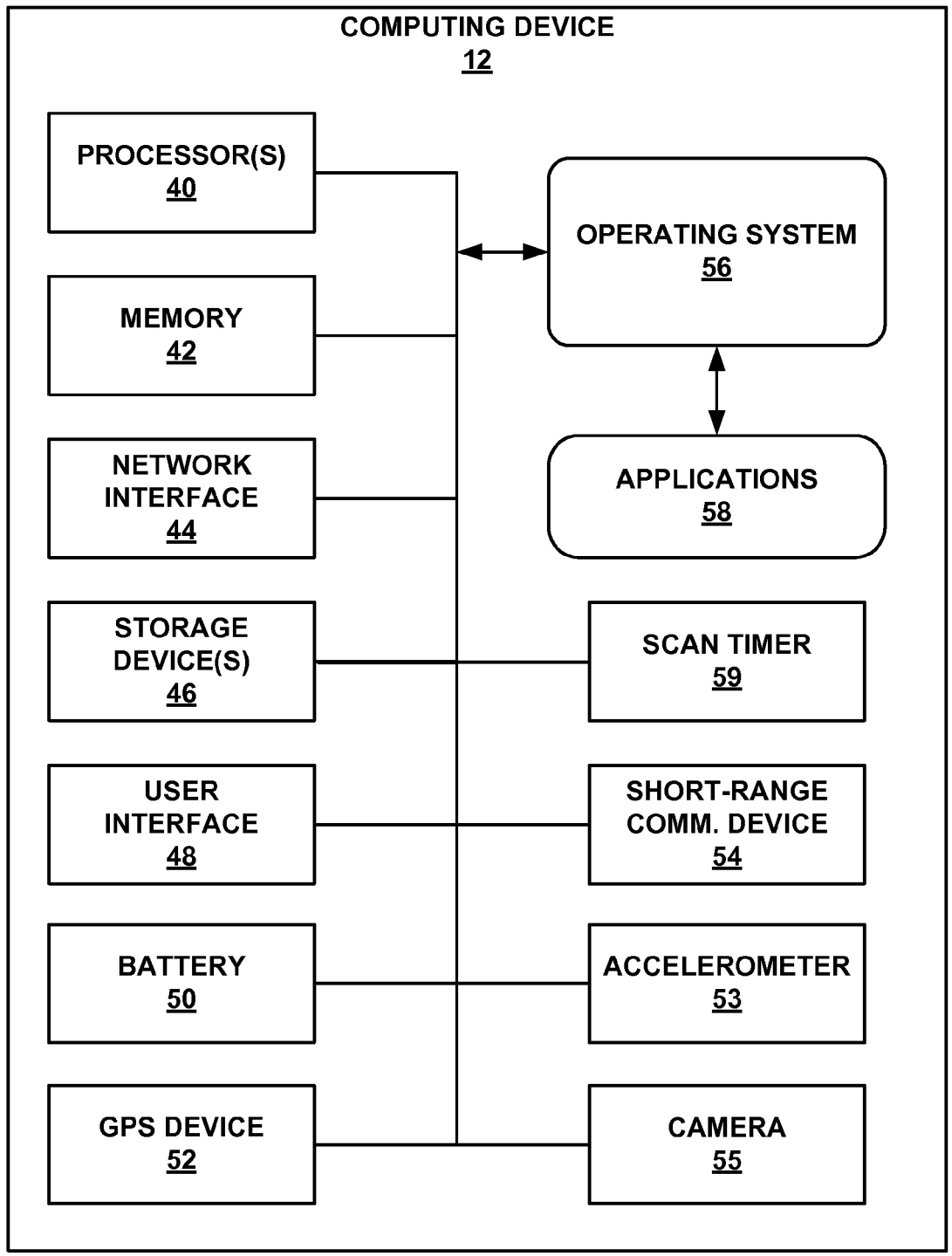
FIG. 2 is a block diagram illustrating components of one example of the computing device shown in FIG. 1, in accordance with one or more aspects of the present disclosure.

FIG. 2 is a block diagram illustrating components of one example of computing device 12 shown in FIG. 1. FIG. 2 illustrates only one particular example of computing device 12, and many other example embodiments of computing device 12 may be used in other instances. For example, computing device 12 may include additional components and run multiple different applications.

As shown in the specific example of FIG. 2, computing device 12 includes one or more processors 40, memory 42, a network interface 44, one or more storage devices 46, user interface 48, battery 50, GPS device 52, short-range communication device 54, accelerometer 53, camera 55, and scan timer 59. Computing device 12 also includes an operating system 56, which may include modules and/or applications that are executable by processors 40 and computing device 12. Computing device 12, in one example, further includes one or more applications 58. One or more applications 58 are also executable by computing device 12. Each of components 40, 42, 44, 46, 48, 50, 52, 53, 54, 55, 56, and 58 may be interconnected (physically, communicatively, and/or operatively) for inter-component communications.

Processors 40, in one example, are configured to implement functionality and/or process instructions for execution within computing device 12. For example, processors 40 may be capable of processing instructions stored in memory 42 or instructions stored on storage devices 46. These instructions may define or otherwise control the operation of operating system 56 and applications 58. For example, processors 40 may dynamically adjust the short-range communication read rate according to instructions stored on storage devices 46 and/or memory 42.

Memory 42, in one example, is configured to store information within computing device 12 during operation. Memory 42, in some examples, is described as a computer-readable storage medium. In some examples, memory 42 is a temporary memory, meaning that a primary purpose of memory 42 is not long-term storage. Memory 42, in some examples, is described as a volatile memory, meaning that memory 42 does not maintain stored contents when the computer is turned off. Examples of volatile memories include random access memories (RAM), dynamic random access memories (DRAM), static random access memories (SRAM), and other forms of volatile memories known in the art. In some examples, memory 42 is used to store program instructions for execution by processors 40. Memory 42, in one example, is used by software or applications running on computing device 12 (e.g., one or more of applications 58) to temporarily store information during program execution.

Storage devices 46, in some examples, also include one or more computer-readable storage media. Storage devices 46 may be configured to store larger amounts of information than memory 42. Storage devices 46 may further be configured for long-term storage of information. In some examples, storage devices 46 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 12, in some examples, also includes a network interface 44. Computing device 12, in one example, utilizes network interface 44 to communicate with external devices via one or more networks, such as network 16 in FIG. 1. Network interface 44 may be a network interface card, such as an Ethernet card, an optical transceiver, a radio frequency transceiver, or any other type of device that can send and receive information. Other examples of such network interfaces may include Bluetooth, 3G and WiFi radios in mobile computing devices as well as USB. In some examples, computing device 12 utilizes network interface 44 to wirelessly communicate with an external device (not shown) such as a server, mobile phone, or other networked computing device.

Computing device 12, in one example, also includes one or more user interfaces 48. User interface 48 may be an example of user interface 14 described in FIG. 1. User interface 48 may be configured to receive input from a user (e.g., tactile, audio, or video feedback). User interface 48 may include a touch-sensitive and/or a presence-sensitive screen, mouse, a keyboard, a voice responsive system, or any other type of device for detecting a command from a user. In some examples, user interface 48 includes a touch-sensitive screen, mouse, keyboard, microphone, or camera.

User interface 48 may also include, combined or separate from input devices, output devices. In this manner, user interface 48 may be configured to provide output to a user using tactile, audio, or video stimuli. In one example, user interface 48 may include a touch-sensitive screen, sound card, a video graphics adapter card, or any other type of device for converting a signal into an appropriate form understandable to humans or machines. In addition, user interface 48 may include a speaker, a cathode ray tube (CRT) monitor, a liquid crystal display (LCD), or any other type of device that can generate intelligible output to a user.

Computing device 12, in some examples, include one or more batteries 50, which may be rechargeable and provide power to computing device 12. Battery 50, in some examples, is made from nickel-cadmium, lithium-ion, or other suitable material. In other examples, battery 50 may be a power source capable of providing stored power or voltage from another power source.

Computing device 12 may also include one of more GPS devices 52. GPS device 52 may include one or more satellite radios capable of determining the geographical location of computing device 12. For example, GPS device 52 may provide latitude and longitude coordinates to computing device 12. Computing device 12 may utilize GPS device 52 to confirm the validity of visual media 22, for example. Alternatively, computing device 12 may transmit the GPS coordinates to remote server 18 to identify the location and the specific visual media 22. In addition, GPS coordinates from GPS device 52 may at least partially determine when processors 40 increase the short-range communication read rate.

In addition, computing device 12 may include one or more short-range communication device 54. For example, short-range communication device 54 may be an NFC device. As described herein, short-range communication device 54 may be active hardware that is configured to obtain position information from position devices 24 or any other information from other short-range communication devices. In general, short-range communication device 54 may be configured to communicate wirelessly with other devices in physical proximity to short-range communication device 54 (e.g., approximately 0-10 meters). In other examples, short-range communication device 54 may be replaced with an alternative short-range communication device configured to obtain position information 26 from respective position devices 24. These alternative short-range communication devices may operate according to Bluetooth, Ultra-Wideband radio, or other similar protocols. Short-range communication device 54 may transmit short-range communication signals at a read rate that is adjustable by processors 40 according to the disclosure herein.

Computing device 12 may also include various sensors. Computing device 12 may include one or more of an accelerometer 53 that sense accelerations of computing device 12. Accelerometer 53 may be a three-axis accelerometer that senses accelerations in multiple dimensions. Alternatively, accelerometer 53 may include two or more single-axis accelerometers, for example. Computing device 12 may utilize accelerometer 53 to detect movement (e.g., an acceleration or velocity parameter) of computing device 12 and increase or decrease the short-range communication read rate according to the output from accelerometer 53. In some examples, computing device 12 may also include one or more gyroscopes to sense angular acceleration or compasses to sense the direction computing device 12. Any of these movement or position sensors may be used by computing device 12 to determine when to increase or decrease the short-range communication read rate.

Camera 55 may be an optical sensor that computing device 12 controls. Computing device 12 may capture images and/or video using camera 55. In some examples, camera 55 may be used to detect movement of computing device 12 with respect to visual media 22. Camera 55 may be located on any surface of computing device 12 in some examples. In other examples, computing device 12 may include two or more cameras. Camera 55 may alternatively be used to determine an ambient light intensity that is used for a trigger event in adjusting the short-range communication read rate. In other examples, a separate ambient light sensor may be used to sense the ambient light levels and indicate to computing device 12 when to adjust the short-range communication read rate.

Scan timer 59 may be a timer separate from processors 40 and used to set or control the short-range communication read rate of short-range communication device 54. For example, processors 40 may receive the output (e.g., the sensed value) of a sensor (e.g., accelerometer 53). Processors 40 may then detect one or more trigger events based on the output from the sensor. Processors 40 may then command the scan timer to control short-range communication device 54 at a selected read rate. In other words, processors 40 may be the control logic that sends a read rate to scan timer 59. Short-range communication device 54 then operates at the read rate of scan timer 59. In other examples of computing device 12, a different component (e.g., one or more processors 40) may directly control the operation of short-range communication device 54 without scan timer 59.

Computing device 12 may include operating system 56. Operating system 56, in some examples, controls the operation of components of computing device 12. For example, operating system 56, in one example, facilitates the interaction of application 58 with processors 40, memory 42, network interface 44, storage device 46, user interface 48, battery 50, GPS device 52, short-range communication device 54, accelerometer 53, camera 55, and scan timer 59.

Application 58 may be an application configured to manage obtaining position information 26, transmitting position information 26 to remote server 18, receiving supplemental information from remote server 18, and presenting the supplemental information on computing device 12. In addition, or alternatively, application 58 may control the increasing or decreasing of the short-range communication read rate. Application 58 may control one or more of these features. Application 58 may thus control any aspect of interaction with visual media 22 and/or position devices 24. Application 58 may be automatically launched upon detecting one of position devices 24 if application 58 is not already being executed by processors 40. Application 58 may also be used to measure and/or calculate the detected movement of computing device 12 or any other functionality described herein. Although one application 58 may manage supplemental information and the adjustment of the short-range communication read rate, separate applications may perform these functions in other examples. Although application 58 may be software independent from operating system 56, application 58 may be a sub-routine of operating system 56 in other examples.

Computing device 12 may utilize additional applications to manage any functionality described herein with respect to system 10 or other aspects of computing device 12. Any applications (e.g., application 58) implemented within or executed by computing device 12 may be implemented or contained within, operable by, executed by, and/or be operatively/communicatively coupled to components of computing device 12 (e.g., processors 40, memory 42, network interface 44, and/or storage devices 46).

Figure 3:
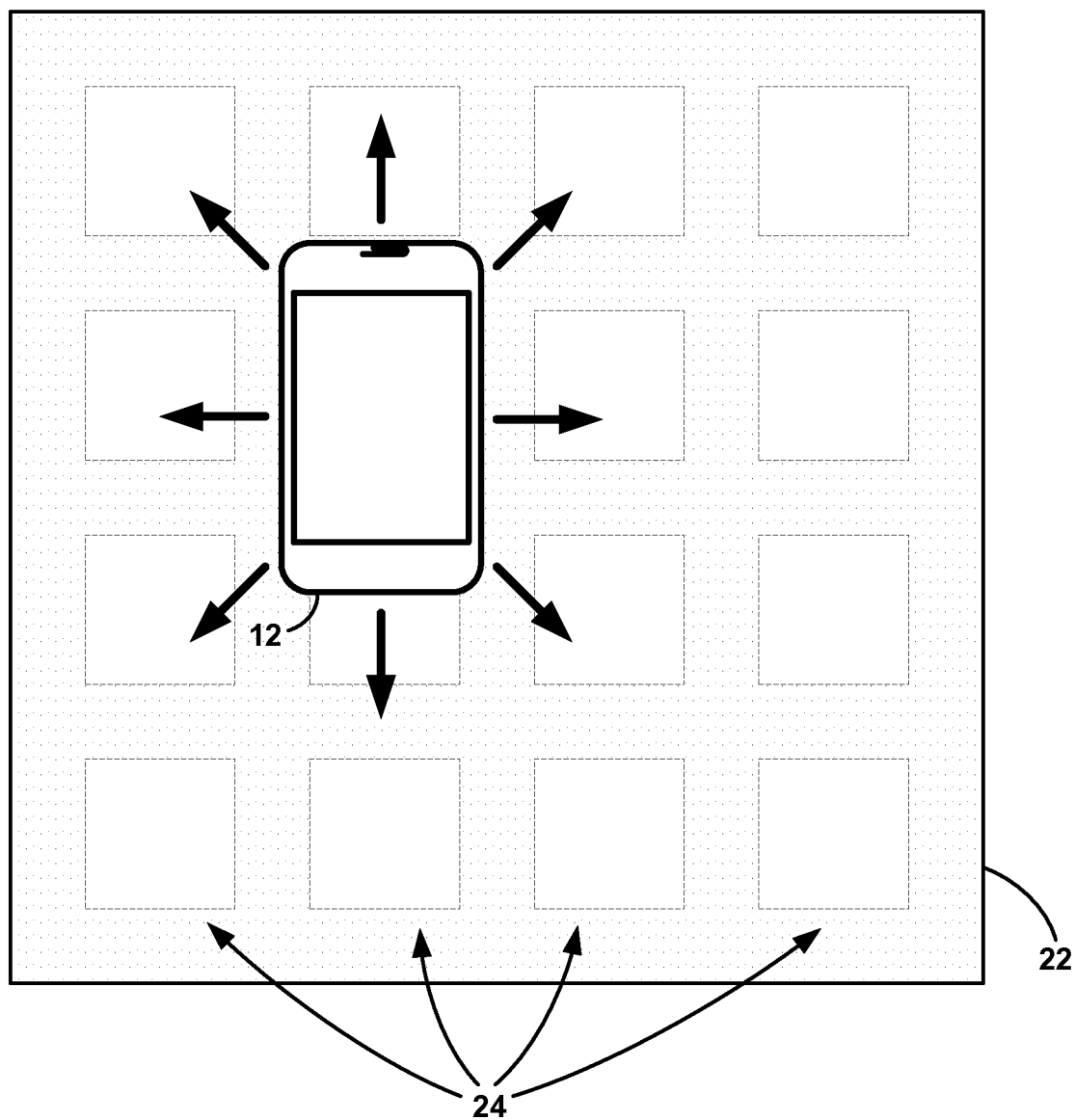
FIG. 3 is a conceptual diagram illustrating an example of a computing device that moves to detect multiple position devices.

FIG. 3 is a conceptual diagram illustrating computing device 12 that moves to detect multiple position devices. As shown in FIG. 3, computing device 12 may be moved by a user with respect to visual media 22 and the one or more position devices 24 provided behind visual media 22. The user may move or slide computing device 12 along the surface of visual media 22 to the desired portion of visual media 22. Computing device 12 may thus travel between two or more position devices 24 arranged behind the surface of visual media 22. In this manner, the user may move computing device 12 in any direction as indicated by the example arrows of FIG. 3, and these directions may not need to follow any arrangement of position devices 24. Indeed, the user of computing device 12 may not be able to detect or notice any position devices 24 associated with visual media 22.

To facilitate the detection of each of position devices 24 during movement of computing device 12, computing device 12 may increase or adjust the short-range communication read rate based on the movement of computing device 12. Typically, computing device 12 may operate a short-range communication device (e.g., device 54 of FIG. 2) at a default short-range communication read rate. This read rate may be selected to balance the need to communication with short-range communication devices (e.g., position devices 24) and the desire to conserve battery life. Therefore, this default short-range communication read rate may be too low to allow computing device 12 to obtain position information 26 from each of position devices 24 when computing device 12 is in motion. This may be particularly true for more dense two-dimensional or three-dimensional arrays of position devices 24 or other short-range communication devices. Therefore, according to the disclosure herein, computing device 12 may increase the short-range communication read rate according to an on-demand type technique that allows computing device 12 to detect and communicate with short-range communication devices such as position devices 24 during limited windows of time.

Generally, according to the example of FIG. 1, computing device 12 may be moved across or along the surface of visual media 22, such as generally within a single plane to obtain supplemental information associated with portions of visual media 22. In other words, computing device 12 may obtain position information from position devices 24 only when computing device 12 is within a communication range of the position devices 24. The communication range for position devices 24 and computing device 12 (e.g., the distance needed for communication) may be dependent, at least in part, on the size and/or diameter of the antenna coil within computing device 12. In this manner, computing device 12 may obtain position information 26 at greater distances from a position device with larger antenna dimensions.

Generally, computing device 12 may obtain position information when computing device is within a range of between approximately 1.0 centimeters and 100 centimeters from visual media 22. In one example, computing device 12 may need to be within approximately 10 centimeters of position devices 24. In other examples, computing device 12 may need to be within a distance between approximately 1.0 centimeters and 5.0 centimeters. In one example, computing device 12 may need to be within a distance of approximately 2.5 centimeters. However, computing device 12 may need to be placed relatively close to visual media 22 such that computing device 12 does not obtain position information from multiple position devices 24 at the same time. The user may thus keep computing device 12 relatively close to visual media 22 to obtain position information from position devices 24 and related supplemental information associated with the various portions of visual media 22.

Figure 4:
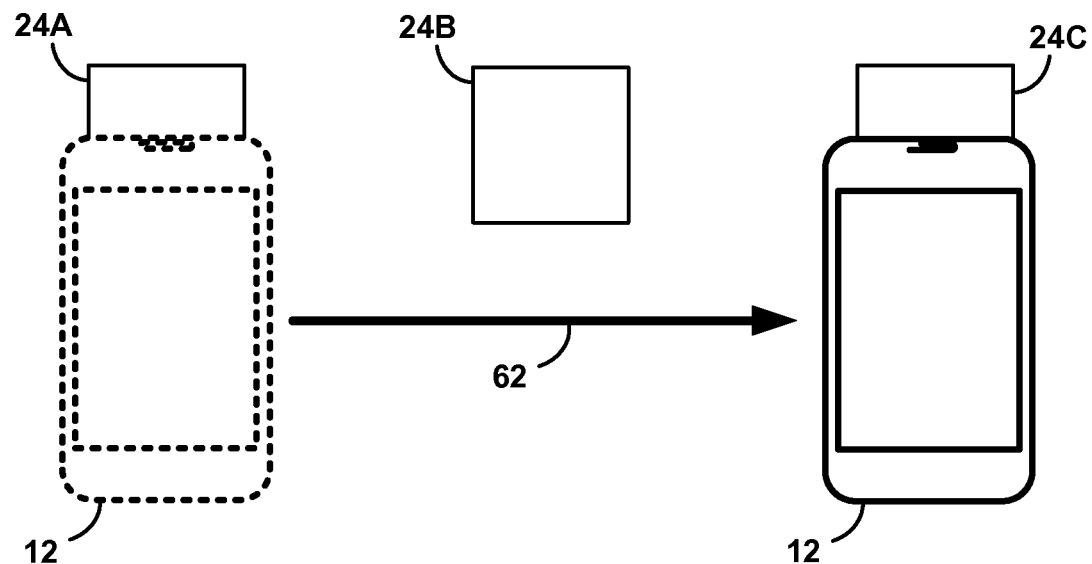
FIG. 4 is a conceptual diagram illustrating example movement of a computing device and updating read rates for short-range communication.
Figure 4:
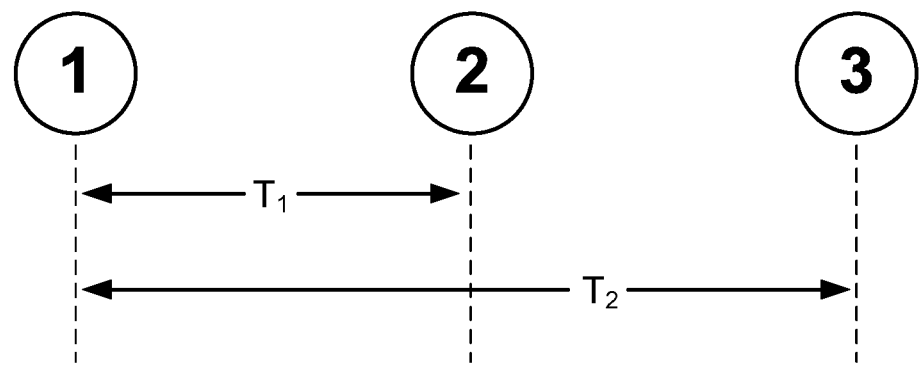

FIG. 4 is a conceptual diagram illustrating movement of computing device 12 and updating read rates for short-range communication. As shown in FIG. 6, computing device 12 may be moved between different position devices 24 (e.g., position devices 24A, 24B, and 24C). This movement may occur as a user desires to move computing device 12 across visual media 22 or to one or more desired portions of visual media 22. However, with a short-range communication read rate too slow, computing device 12 may not be capable of obtaining position information 26 from each of position devices 26 as computing device 12 moves in the direction of arrow 62.

To illustrate this situation, computing device 12 may initially be at location 1 which corresponds with position device 14A. At location 1, computing device 12 may obtain position information 26 from position device 14A. The user may then move computing device 12 in the direction of arrow 62 with sufficient velocity that it takes approximately one second ($T_2$) for computing device 12 to move from location 1 to location 3. With a default short-range communication read rate of approximately 1.0 Hz, computing device 12 would be able to subsequently obtain position information from position device 24C at location 3.

However, the short-range communication read rate would have been insufficient for computing device 12 to obtain position information from position device 24B at location 2. In other words, the time $T_1$ may be shorter than the one second time period between each scan of the default 1.0 Hz short-range communication read rate. In order for computing device 12 to obtain position information from position device 24B during movement in the direction of arrow 62, computing device 12 may increase the short-range communication read rate.

For example, accelerometer 53 of computing device may output an acceleration value that exceeds a threshold such that computing device 12 increases the short-range communication read rate. Computing device 12 may thus increase the read rate to approximately 10 Hz. With a read rate of 10 Hz, computing device 12 may transmit short-range communication signals ten times between locations 1 and 2 if $T_2$ is approximately one second. Therefore, the increased read rate substantially increases the likelihood that computing device 12 will also be able to obtain position information from position device 24B during movement of computing device 12.

Although position devices may be arranged in a dense array or pattern, less dense arrays of position devices may reduce the cost of mounting surfaces or be more practical for visual media covering large areas. For example, the distance between position devices 24 may be between approximately 0.5 centimeters and 100 centimeters. More specifically, the distance between position devices may be between approximately 1.0 centimeters and 10 centimeters.

Figure 5A:
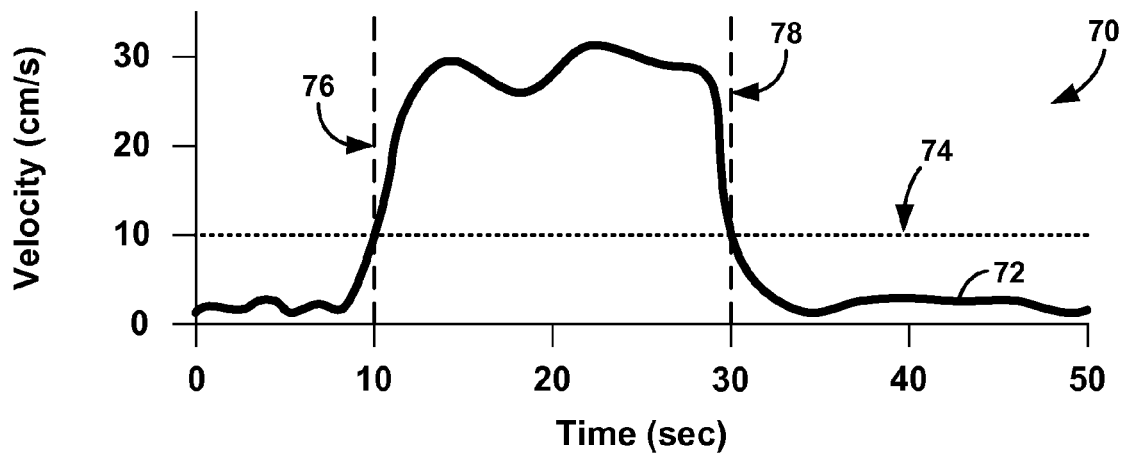
FIGS. 5A-5C are illustrations of example graphs of a velocity of a computing device changes to read rates based on the velocity.
Figure 5B:
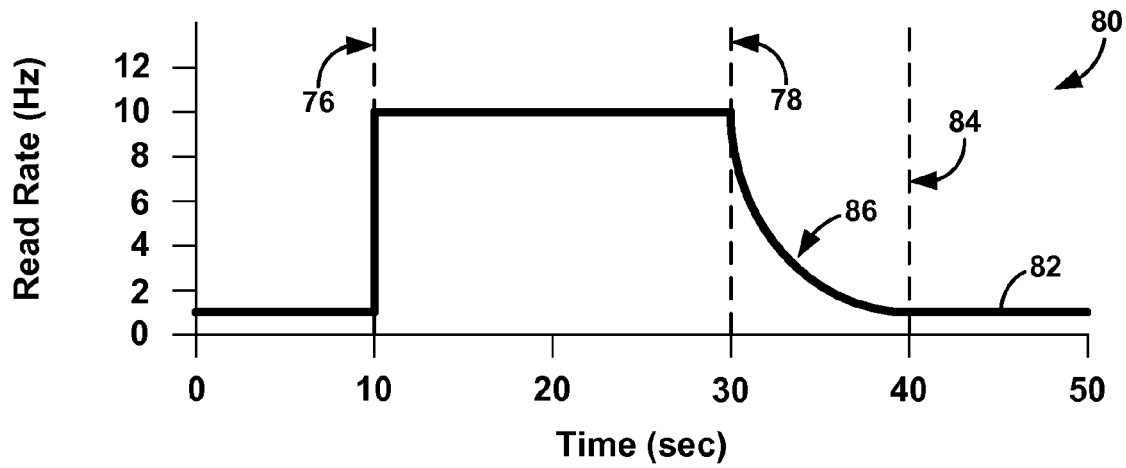
Figure 5C:
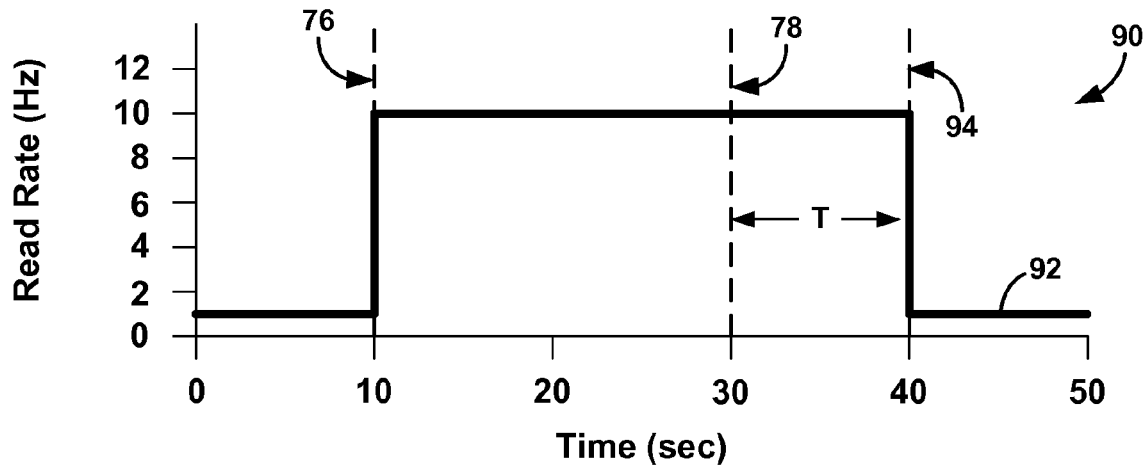

FIGS. 5A-5C are illustrations of example graphs of a velocity of computing device 12 and adjustments to short-range communication read rates based on the sensed velocity. As shown in FIG. 5A, graph 70 presents an example velocity value 72 over time. Velocity value 72 may be calculated from an output of an accelerometer, for example. The output of the accelerometer may be representative of the acceleration of computing device 12. Therefore, computing device 12, may integrate the acceleration output and, in some examples, calibrate the resulting velocity to generate velocity value 72. Graph 70 provides velocity value 72 in centimeters per second (cm/s) and time in seconds (sec) as an example.

Velocity value 72 may change over time as computing device 12 is physically moved. If the sensed velocity value 72 is being used as a trigger for increasing and/or decreasing the short-range communication read rate, computing device 12 may compare velocity value 72 to threshold 74. Threshold 74 may be selected such that minimal or insignificant movements (with respect to short-range communication) to computing device 12 will not trigger an increase in the short-range communication read rate. In the example of FIG. 5A, threshold 74 may be set to approximately 10 cm/s. Therefore, computing device 12 may compare velocity value 72 to threshold 74 and detect a trigger event at any time velocity value 72 meets and/or exceeds threshold 74.

As shown in graph 70, velocity value 72 exceeds threshold 74 at approximately the 10 second mark. At this time, computing device 12 may detect trigger event 76 because velocity value 72 has exceeded threshold 74. In response to trigger event 76, computing device 12 may increase the short-range communication read rate based on instructions stored by computing device 12. After approximately 20 seconds of the above-threshold velocity value 72, velocity value 72 may decrease below threshold 74. Computing device 12 may detect trigger event 78 when threshold 74 is again crossed. In response to this sub-threshold velocity value 72, computing device 12 may determine how and when to decrease the short-range communication read rate.

FIGS. 5B and 5C illustrate example short-range communication read rates corresponding to the velocity value 72 detected in FIG. 5A. In the example of FIG. 5B, computing device 12 may employ a decrease schedule when decreasing read rate 82. Graph 80 provides read rate 82 (shown in Hz) with respect to time (sec). In response to trigger event 76, read rate 82 may increase from the first level of approximately 1.0 Hz to the second level of approximately 10 Hz. This increase in read rate may be calculated by multiplying the first level by a predetermined value (e.g., a predetermined value of 10). Computing device 12 may maintain the second level during the duration of time that velocity value 72 exceeds threshold 74. In response to detecting trigger event 78, computing device 12 may apply exponentially decreasing schedule 86 to decrease read rate 82. In this manner, computing device 12 may taper read rate 82 off or decay read rate 82 once computing device 12 is no longer moving above threshold. At time 84, approximately the 40 second mark, read rate 82 may have been completely decreased back to the original first level of approximately 1.0 Hz. Exponentially decreasing schedule 86 may be customized with various coefficients or other modifications that adjust the decreasing slope of read rate 82.

In alternative examples, computing device 12 may employ different types of decreasing schedules instead of exponentially decreasing schedule 86. For example, computing device 12 may decrease read rate 82 according to a step-wise function in two or more iterations. The step-wise function may include identical step sizes or varying step sizes and/or durations. In this manner, the step-wise decreasing schedule may be a combination of multiple steps and an exponential or parabolic schedule. In any case, computing device 12 may decrease read rate 82 according to any type of schedule. Decrease schedules may be stored in a memory of computing device 12.

In the alternative example of FIG. 5C, computing device 12 may employ a time period (e.g., a timer) to determine when to decrease read rate 92. Graph 90 provides read rate 92 (shown in Hz) with respect to time (sec). In response to trigger event 76, read rate 92 may increase from the first level of approximately 1.0 Hz to the second level of approximately 10 Hz. Computing device 12 may maintain the second level during the duration of time that velocity value 72 exceeds threshold 74. In response to detecting trigger event 78, computing device 12 may being a timer that tracks time period T.

Time period T may provide a lag before decreasing read rate 92 that may accommodate subsequent movement of computing device 12. In other words, even though velocity value 72 has decreased below threshold 10, computing device 12 may again be moved by the user. By keeping an elevated read rate after trigger event 78, computing device 12 may still provide a sufficient read rate if computing device 12 is moved again. After the timer determines that time period T has elapsed at time 94, computing device 12 may decrease read rate 92 immediately back to the first level of approximately 1.0 Hz. Although time period T is shown as approximately 10 seconds, time period T may be shorter or longer as described herein. The duration of time T may be stored in a memory of computing device 12.

In some examples, computing device 12 may combine certain aspects of FIGS. 5B and 5C. For example, in response to time period T elapsing at time 84, computing device 12 may then employ a decrease schedule (e.g., a step-wise decreasing schedule) to decrease read rate 92. In alternative examples, time period T may start at trigger event 76 and run until time period T elapses or expires, regardless of when trigger event 78 occurs. In this manner, computing device 12 may not need to track trigger event 78 or any other decreases to velocity value 72 or another parameter. For example, time period T may have an approximately 30 second duration. When time period T elapses, computing device 12 may decrease read rate 92. If computing device 12 detects a subsequent trigger event, whether time period T has elapsed or not, computing device 12 may restart time period T (e.g., the timer that tracks time period T may be a retriggerable timer or computing device 12 may be a monostable system). In other examples, computing device 12 may only restart time period T if the time period has elapsed.

As described herein, the short-range communication read rates may be determined by instructions stored by computing device 12. In one example, a sensed value exceeding a threshold may cause computing device 12 to multiply the previous read rate by a predetermined multiplier. This multiplier may this be applied to various default read rates or current read rates such that the read rate is always increased in response to detecting a trigger event (e.g., a threshold is exceeded). For example, the multiplier may be a predetermined value generally be between 1.1 and 500. More specifically, the multiplier value may be between 2.0 and 20. In one example, the multiplier value may be approximately 8.0. The predetermined value of the multiplier may alternatively be less than one to decrease the read rate. For example, the predefined value of the multiplier may be between approximately 0.05 and 0.99. In another example, the predefined value may be between approximately 0.1 and 0.9. In any example, the multiplier may be selected to achieve short-range communication read rates described herein. In this manner, the increased read rates may be based on a default or baseline short-range communication read rate instead of being an absolute value stored by computing device 12. In alternative examples, the read rate may be increased according to an increase schedule (e.g., a single change in value, a step-wise schedule, or an exponential schedule) similar to the various decrease schedules described herein.

Although the parameter of velocity is illustrated in the examples of FIGS. 5A-5C, other parameters (e.g., acceleration or light intensity) may similarly be plotted with respect to the sensed value and a threshold. Computing device 12 may similarly employ a time period or a decrease schedule when decreasing the short-range communication read rate in response to sensed values of other parameters. For example, computing device 12 may compare a sensed acceleration value and compare the acceleration value to a threshold. An example threshold for accelerations may be between approximately 10.0 meters per second (m/s) and 49.0 m/s. In one example, the accelerometer threshold may be approximately 14.7 m/s.

Figure 6A:
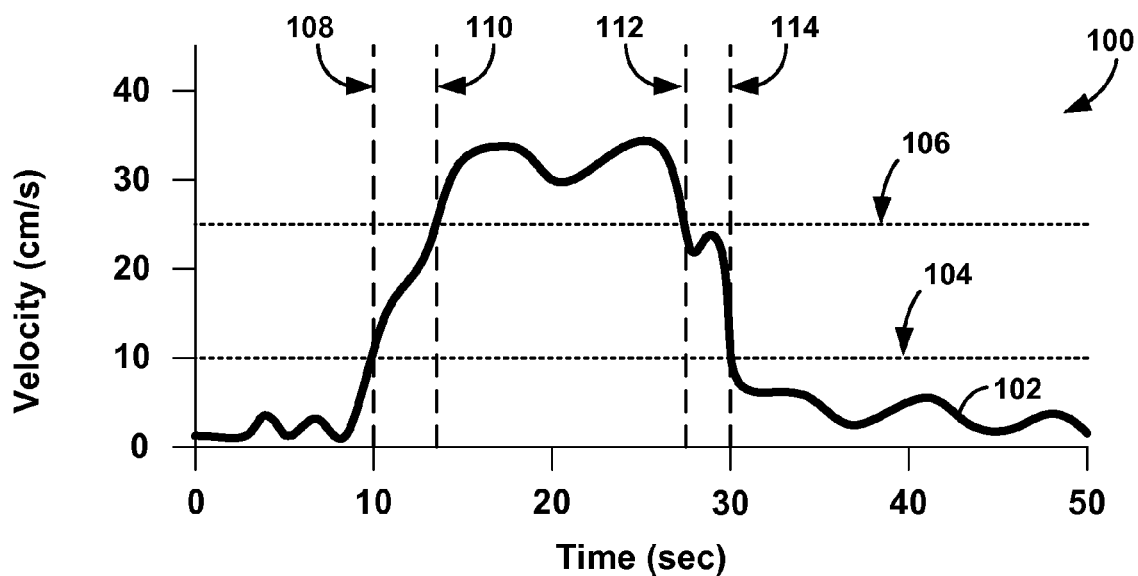
FIGS. 6A-6B are illustrations of example graphs of a velocity of a computing device selected read rates associated with the detected velocity.
Figure 6B:
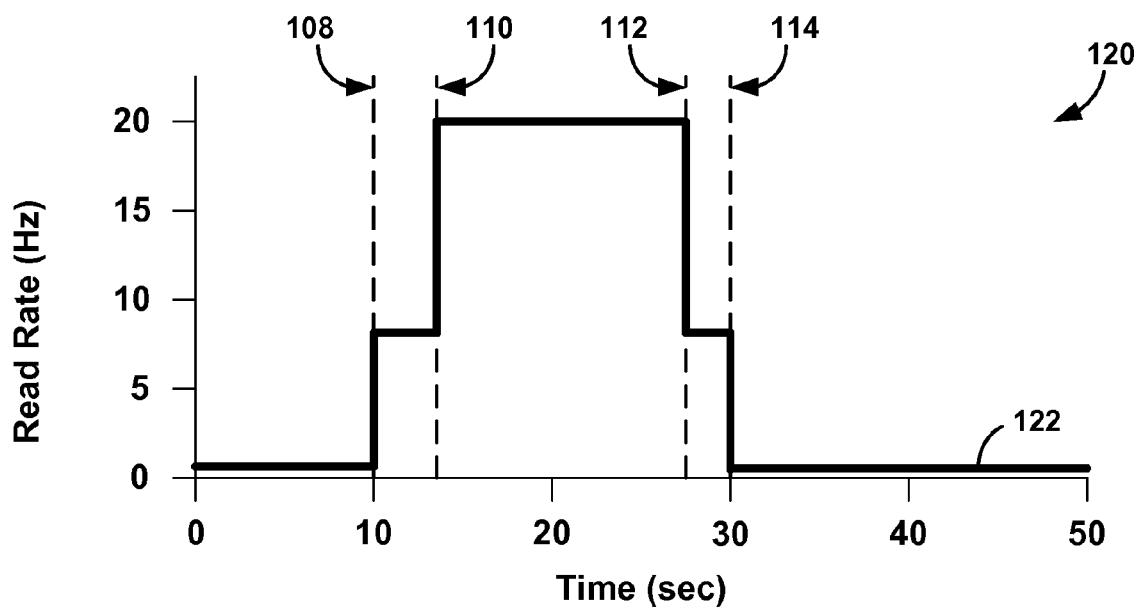

FIGS. 6A-6B are illustrations of example graphs of a velocity of computing device 12 and selected read rates associated with the detected velocity. As shown in FIG. 6A, graph 100 presents an example velocity value 102 over time. Velocity value 102 may be calculated from an output of an accelerometer, for example. The output of the accelerometer may be representative of the acceleration of computing device 12. Therefore, computing device 12, may integrate the acceleration output and, in some examples, calibrate the resulting velocity to generate velocity value 102. Graph 100 provides velocity value 102 in centimeters per second (cm/s) and time in seconds (sec) as an example.

Velocity value 102 may change over time as computing device 12 is physically moved (similar to graph 70 of FIG. 5A). However, graph 100 indicates that computing device 12 may compare velocity value 102 to multiple thresholds 104 and 106. Threshold 104 may be selected such that minimal or insignificant movements (with respect to short-range communication) to computing device 12 will not trigger an increase in the short-range communication read rate. In the example of FIG. 6A, threshold 104 may be set to approximately 10 cm/s. In addition, threshold 106 may be set at a higher velocity such that computing device 12 can further increase the read rate and accommodate less time available for computing device 12 to interrogate passing short-range communication devices. In the example of FIG. 6A, threshold 106 may be set to approximately 25 cm/s. Therefore, computing device 12 may compare velocity value 102 to both thresholds 104 and 106 to determine when to increase the short-range communication read rate.

As shown in graph 100, velocity value 102 exceeds threshold 104 at approximately the 10 second mark. At this time, computing device 12 may detect trigger event 108 because velocity value 102 has exceeded threshold 104. In response to trigger event 108, computing device 12 may increase the short-range communication read rate based on instructions stored by computing device 12. In addition, velocity value 102 may exceed threshold 106 at approximately the 13 second mark. At this time, computing device 12 may detect trigger event 110 because velocity value 102 has exceeded threshold 106. In response to trigger event 110, computing device 12 may again increase the short-range communication read rate above that of the read rate from trigger event 108.

After approximately 15 seconds of the super-threshold velocity value 102, velocity value 102 may decrease below threshold 106. Computing device 12 may detect trigger event 112 when threshold 106 is again crossed. In addition, velocity value 102 may decrease below threshold 10. Computing device 12 may detect trigger event 114 when threshold 104 is crossed again. In response to each of these threshold crossing changes to velocity value 102, computing device 12 may determine how and when to decrease the short-range communication read rate.

FIG. 6B illustrate example short-range communication read rates based on multiple thresholds exceeded in FIG. 6A. In other words, computing device 12 may adjust the read rate as the velocity changes (e.g., a function based on an equation or a lookup table). In the example of FIG. 6B, computing device 12 may adjust the short-range communication read rate in response to thresholds 104 and 106 being crossed. Graph 120 provides read rate 122 (shown in Hz) with respect to time (sec). In response to trigger event 114, read rate 122 may increase from the first level of approximately 1.0 Hz to the second level of approximately 8.0 Hz. Computing device 12 may maintain the second level until computing device 12 detects trigger event 110. In response to detecting trigger event 110, computing device 12 may again increase the read rate to a third level of approximately 20 Hz.

Computing device 12 may then maintain the read rate at the third level during the duration of time that velocity value 102 exceeds threshold 106. In response to detecting trigger event 112, computing device 12 may immediately decrease read rate 122 to the second level. In response to subsequently detecting trigger event 114, computing device 12 may immediately decrease read rate 122 back down to the initial first level. In this manner, computing device 12 may match changes in the read rate to thresholds being exceeded by the sensed value of the parameter. In some examples, this type of on-demand read rate adjustment may be referred to as mapping the parameter value to respective read rates. In other words, the read rate may be scaled up or down according to any changes in the velocity or acceleration detected by computing device 12.

In addition, the mapping may be done with one or more different predetermined values of a multiplier to change between levels. The respective predetermined value may be multiplied by the current read rate when increasing read rate 122, and the current read rate may be divided by the respective predetermined value when decreasing read rate 122. Although only two thresholds 104 and 106 are provided, computing device 12 may track more than two thresholds, such as 5, 10, or more thresholds. Alternatively, computing device 12 may map the sensed values to read rates without using thresholds. For example, computing device 12 may select the read rates after applying the sensed values to a lookup table or an equation that associates sensed values of the parameter to respective read rates.

In other examples of FIG. 6B, computing device 12 may employ a decrease schedule to decrease read rate 122 in response to trigger events 112 and/or 114. For example, computing device 12 may decrease read rate 122 with a step-wise decrease schedule or an exponential decrease schedule. In some examples, computing device 12 may only decrease read rate 122 according to a schedule when computing device 12 is returning read rate 122 to the original or default read rate.

Figure 7:
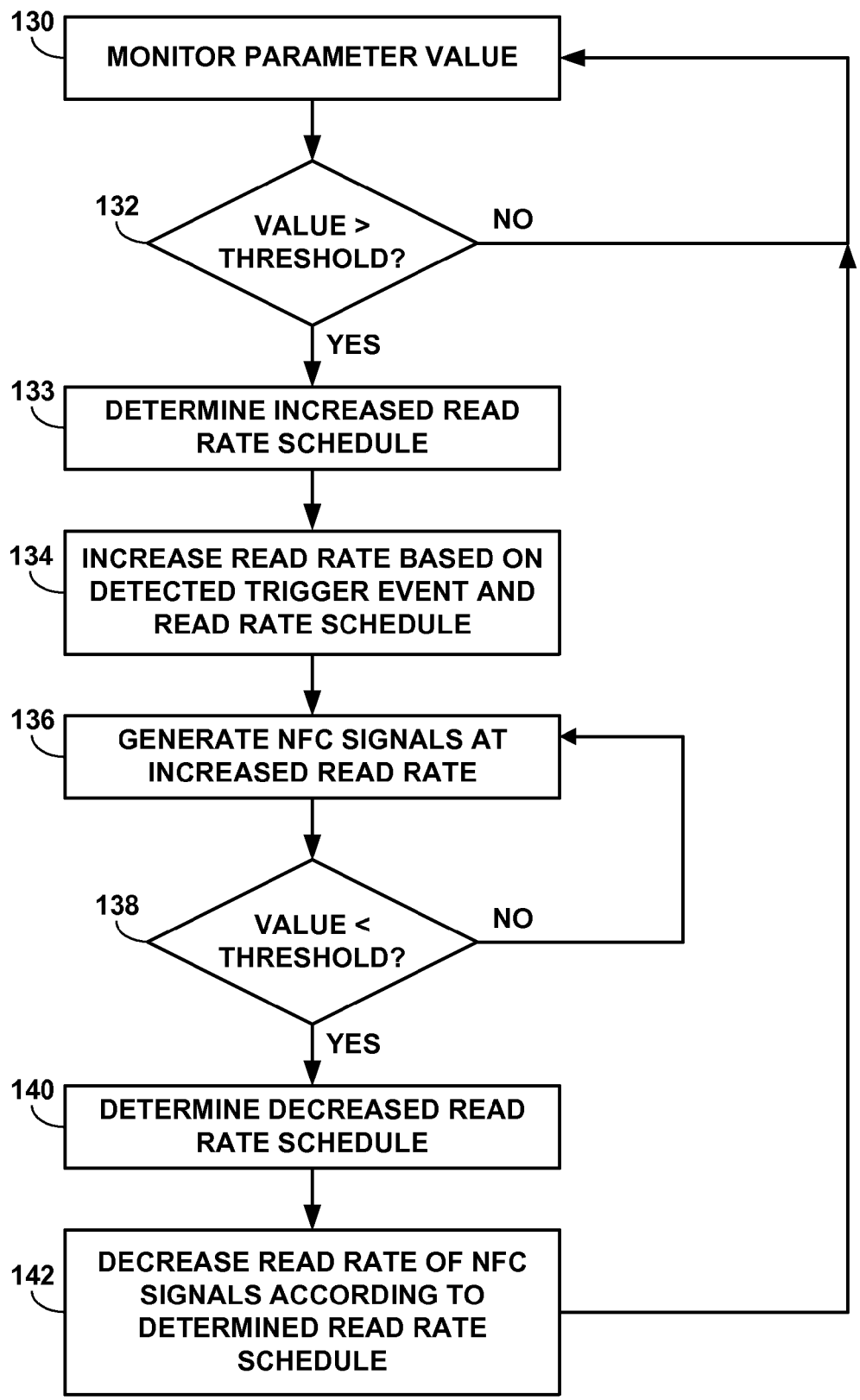
FIG. 7 is a flow diagram illustrating an example process that may be performed by a computing device to change short-range communication read rates in response to a parameter value exceeding a threshold.

FIG. 7 is a flow diagram illustrating an example process that may be performed by a computing device (e.g., computing device 12) to increase short-range communication read rates in response to a parameter value (e.g., acceleration or velocity) exceeding a threshold. The process of FIG. 7 will be described below with respect to processor 40, but other processors, modules, applications, or any combination thereof, may perform the acts attributed to processor 40. Processor 40 may adjust the short-range communication read rate of short-range communication device 54 (e.g., an NFC device).

Processor 40 may monitor the sensed value of a parameter during at least a portion of time when computing device 12 is operational (130). If the sensed value is less than or equal to a predetermined threshold ("NO" branch of block 132), processor 40 may continue to monitor the parameter value. In response to determining that the sensed value is greater than the predetermined threshold ("YES" branch of block 132), processor 40 may determine an increased read rate schedule for increasing the read rate (133). The increased read rate schedule may command an immediate step increase to a different read rate (e.g., a single multiplier predefined value applied to the previous read rate) or increasing the read rate in a step-wise or exponential schedule, for example. Processor 40 then increases the short-range communication read rate based on the detected trigger event (134). The sensed value exceeding the threshold may be the trigger event. As described herein, the increased read rate may be stored in a memory of computing device 12. In addition, the magnitude of the increased read rate may be dependent upon the parameter or type of trigger event.

In response to increasing the read rate, processor 40 may control short-range communication device 54 to generate NFC signals at the increased read rate (136). If processor 40 determines that the sensed value remains greater than the threshold ("NO" branch of block 138), processor 40 continues to generate the NFC signals at the same increased read rate. However, in response to determining that the sensed value is less than or equal to the threshold ("YES" branch of block 138), processor 40 determines the decrease schedule for the short-range communication read rate (140). For example, processor 40 may determine whether to immediately decrease the read rate, decrease the read rate with an exponential decreasing schedule, decrease the read rate with a step-wise schedule, or decrease the read rate after a time period as elapsed. Processor 40 may then decrease the read rate of the NFC signals generated by short-range communication device 54 according to the determined read rate schedule.

Although the example of FIG. 7 is directed to adjusting the short-range communication read rate based on whether the value of a parameter exceeds a single threshold, two or more thresholds may be used in other examples. Therefore, processor 40 may select between three or more different read rates based on the comparison of the sensed value to the different thresholds. In examples in which the parameter is a set of geographical coordinates (e.g., from GPS device 52), processor 40 may compare the coordinates to a bounded area of coordinates or specific coordinates to determine when to increase or decrease the read rate.

Figure 8:
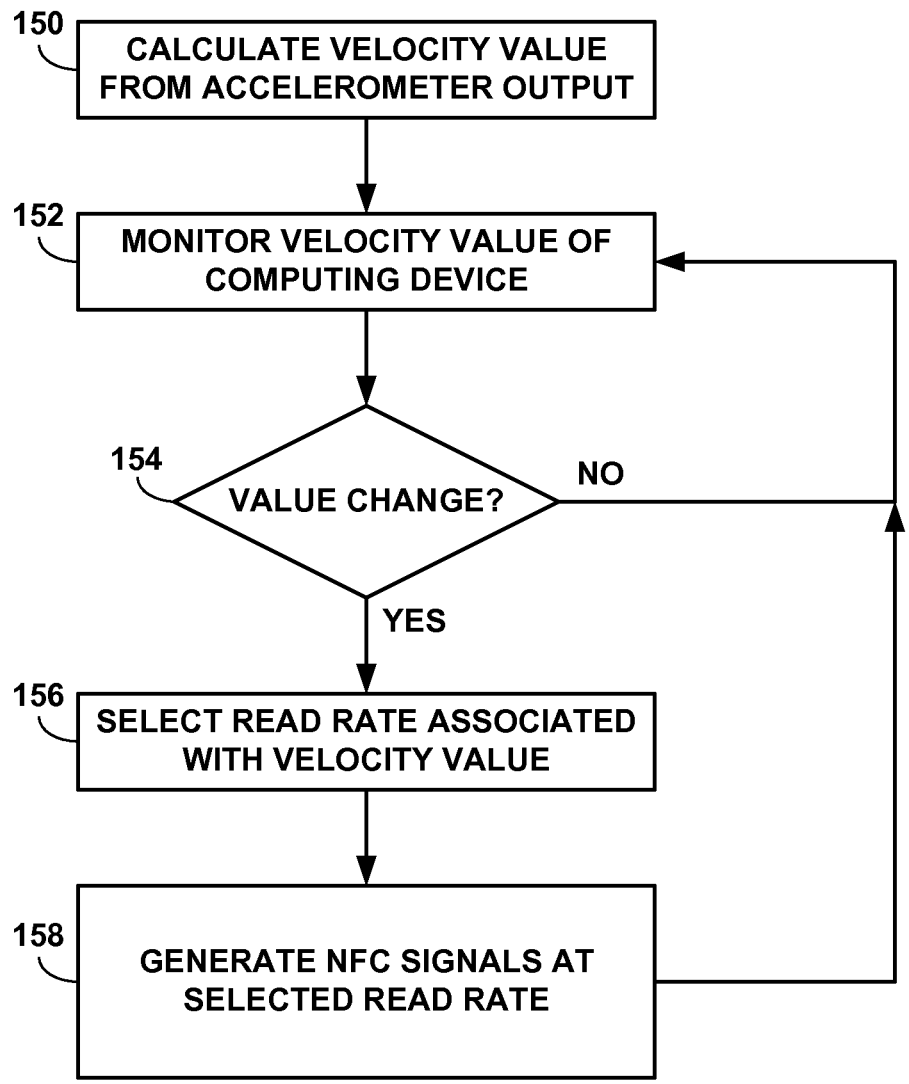
FIG. 8 is a flow diagram illustrating an example process that may be performed by a computing device to select short-range communication read rates based on a detected velocity of the computing device.

FIG. 8 is a flow diagram illustrating an example process that may be performed by a computing device (e.g., computing device 12) to select short-range communication read rates based on a detected velocity of the computing device. The process of FIG. 8 will be described below with respect to processor 40, but other processors, modules, applications, or any combination thereof, may perform the acts attributed to processor 40. Processor 40 may adjust the short-range communication read rate of short-range communication device 54 (e.g., an NFC device). Although the example of FIG. 8 is directed to a velocity of computing device 12, processor 40 may select read rates based on the value of any parameter (e.g., an acceleration of computing device 12).

In the example of FIG. 8, processor 40 calculates a velocity value from the output of an accelerometer (e.g., accelerometer 53) (150). Processor 40 may calculate the velocity value by integrating the acceleration output. Using the calculated velocity value, processor monitors the velocity value of computing device 12 over time (152). If the velocity value does not change ("NO" branch of block 154), processor 40 continues to monitor the velocity value for any changes (152).

In response to processor 40 determining that the velocity value changes ("YES" branch of block 154), processor 40 may select the short-range communication read rate that is associated with the calculated velocity value (156). As described herein, the read rate may be selected from a lookup table or determined based on one or more equations that associate read rates to the velocity value. The lookup table or equations may be stored in a memory of computing device 12 (e.g., memory 42 or storage devices 46). Processor 40 may then command short-range communication device 54 (e.g., via scan timer 59) to generate NFC signals at the selected read rate (158).

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media.

In some examples, a computer-readable storage medium may comprise non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects of the disclosure have been described. These and other embodiments are within the scope of the following claims.

What is claimed is:

1. A method comprising:
 detecting, by a computing device, a trigger event;
 responsive to detecting the trigger event, changing, by the computing device, a near-field communication read rate from a first read rate to a second read rate by multiplying the first read rate by a predetermined value; and
 generating, by the computing device, near-field communication signals at the second read rate,
 wherein the near-field communication read rate defines a number of times the near-field communication signals are generated within a time period, and
 wherein detecting the trigger event comprises at least one of detecting a value sensed by the computing device exceeding a threshold, receiving information from a near-field communication device, or receiving a command from an application executing at the computing device that instructs the computing device to change the near-field communication read rate.

2. The method of claim 1, wherein changing the near-field communication read rate comprises increasing the near-field communication read rate.

3. The method of claim 1, wherein changing the near-field communication read rate comprises decreasing the near-field communication read rate.

4. The method of claim 3, wherein decreasing the near-field communication read rate comprises decreasing the near-field communication read rate according to one of an exponentially decreasing schedule or a step-wise decreasing schedule.

5. The method of claim 1, wherein the trigger event is a first trigger event, and wherein the method further comprises:
 detecting a second trigger event by detecting an elapsed time period subsequent to increasing the near-field communication read rate; and
 responsive to detecting the second trigger event, decreasing the second read rate to a third read rate.

6. The method of claim 1, wherein the trigger event is a first trigger event, and wherein the method further comprises:
 detecting a second trigger event by detecting an elapsed time period within which information is not received from a near-field communication device; and
 responsive to detecting the second trigger event, decreasing the second read rate to a third read rate.

7. The method of claim 3, wherein detecting the trigger event comprises detecting one of a geographical location of the computing device, a predetermined time of day, or an ambient light level below a light threshold.

8. The method of claim 1, wherein the trigger event comprises the value sensed by the computing device exceeding the threshold.

9. The method of claim 8, wherein the sensed value is one of an acceleration or a velocity of the computing device.

10. The method of claim 8, wherein the sensed value is associated with a geographical location of the computing device.

11. The method of claim 1, wherein detecting the trigger event comprises receiving the information from the near-field communication device.

12. The method of claim 1, wherein:
 detecting the trigger event comprises receiving the command from the application executing at the computing device; and
 the command instructs the computing device to change the near-field communication read rate.

13. The method of claim 1, further comprising:
 detecting, by the computing device, a plurality of accelerations of the computing device over time, wherein the trigger event comprises a predetermined pattern of the plurality of detected accelerations.

14. The method of claim 1, wherein:
 changing the near-field communication read rate comprises increasing the near-field communication read rate from the first read rate to the second read rate;
 the trigger event is a first trigger event; and
 the method further comprises:
  detecting one or more second trigger events;
  responsive to detecting the one or more second trigger events, increasing the near-field communication read rate to a third read rate greater than the second read rate; and
  generating near-field communication signals at the third read rate.

15. The method of claim 1, further comprising:
 sensing a value of a parameter subsequent to detecting the trigger event, wherein the parameter is one of an acceleration or a velocity of the computing device;
 selecting a third read rate based on the sensed value, wherein determining the third read rate comprises retrieving the third read rate from one of an equation or a lookup table that associates the parameter to a plurality of read rates; and
 generating near-field communication signals at the third read rate.

16. The method of claim 1, wherein detecting the trigger event comprises detecting a velocity of the computing device over a time period, and wherein the method further comprises at least one of increasing the near-field communication read rate as the velocity increases during the time period and decreasing the near-field communication read rate as the velocity decreases during the time period.

17. The method of claim 1, wherein the value is a first sensed value and the threshold is a first threshold, and wherein the trigger event comprises the first sensed value from a first sensor of the computing device exceeding the first threshold and a second sensed value from a second sensor of the computing device exceeding a second threshold; and
 the first sensor is different from the second sensor.

18. The method of claim 1, wherein the predetermined value is between approximately 0.1 and 0.9 and between approximately 1.1 and 20.0.

19. The method of claim 18, wherein the predetermined value is between approximately 2.0 and 10.0 when changing the near-field communication read rate comprises increasing the near-field communication read rate.

20. The method of claim 1, wherein the both of first read rate and the second read rate are between approximately 1.0 Hz and 20 Hz.

21. The method of claim 1, wherein the computing device is a mobile device.

22. A computer-readable storage device encoded with instructions that cause one or more processors of a computing device to perform operations comprising:
   detecting a trigger event;
   responsive to detecting the trigger event, changing a near-field communication read rate from a first read rate to a second read rate by multiplying the first read rate by a predetermined value; and
   generating near-field communication signals at the second read rate, wherein the near-field communication read rate defines a number of times the near-field communication signals are generated within a time period, and
   wherein detecting the trigger event comprises at least one of detecting a value sensed by the computing device exceeding a threshold, receiving information from a near-field communication device, or receiving a command from an application executing at the computing device that instructs the computing device to change the near-field communication read rate.

23. A computing device comprising:
   one or more processors configured to detect a trigger event and, responsive to detecting the trigger event, change a near-field communication read rate from a first read rate to a second read rate by multiplying the first read rate by a predetermined value, wherein the one or more processors are configured to detect the trigger event by at least one of detecting a value sensed by the computing device exceeding a threshold, receiving information from a near-field communication device, or receiving a command from an application executing at the computing device that instructs the one or more processors to change the near-field communication read rate; and
   a near-field communication module configured to generate near-field communication signals at the second read rate, wherein the near-field communication read rate defines a number of times the near-field communication signals are generated within a time period.

24. The method of claim 8, wherein the sensed value is associated with an ambient light intensity.

* * * * *